(12) United States Patent
Ogata et al.

(10) Patent No.: US 6,804,462 B2
(45) Date of Patent: Oct. 12, 2004

(54) CAMERA PROVIDED WITH EYEPIECE

(75) Inventors: Yasuzi Ogata, Akiruno (JP); Tomoyuki Satori, Kawagoe (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/412,678

(22) Filed: Apr. 14, 2003

(65) Prior Publication Data

US 2004/0005148 A1 Jan. 8, 2004

(30) Foreign Application Priority Data

Apr. 17, 2002 (JP) ........................................ 2002-114933
Jan. 23, 2003 (JP) ........................................ 2003-014956

(51) Int. Cl.$^7$ ............................................. G03B 13/06
(52) U.S. Cl. ........................................ 396/382; 359/345
(58) Field of Search ........................... 396/382; 359/643, 359/645

(56) References Cited

U.S. PATENT DOCUMENTS

| 4,047,222 A | 9/1977 | Moskovich et al. |
| 5,663,834 A | * 9/1997 | Koizumi ..................... 359/643 |
| 6,692,163 B2 | * 2/2004 | Ogata .......................... 396/354 |

FOREIGN PATENT DOCUMENTS

| JP | 63-135914 | 8/1988 |
| JP | 11-33847 | 12/1999 |

* cited by examiner

Primary Examiner—David M. Gray

(74) Attorney, Agent, or Firm—Pillsbury Winthrop LLP

(57) ABSTRACT

A camera includes a screen on which an image of an object is projected, a plurality of reflection surfaces for erecting the image on the screen, and an eyepiece system with positive refracting power for observing the image. In this case, the eyepiece system includes, in order from the object side, a first lens component with positive refracting power, a second lens component with positive refracting power, and a third lens component with negative refracting power. Spacings between the first lens component and the second lens component and between the second lens component and the third lens component are changed to thereby make a diopter adjustment, and the camera satisfies the following conditions:

$$0.15 < \tan(S) < 0.35$$

$$2.00 < fb/Y < 4.00$$

$$-0.80 < f3/f < -0.40$$

where S is an angle, at a diopter of 0 m$^{-1}$, made by the most off-axis chief ray passing through a point on the optical axis at a distance of 23 mm along the optical axis from the exit surface of the third lens component with the optical axis; fb is an air-equivalent length, at a diopter of 0 m$^{-1}$, from the screen to the entrance surface of the first lens component; Y is a diagonal length of the picture plane on the screen; f3 is the focal length of the third lens component; and f is the focal length, at a diopter of 0 m$^{-1}$, of the entire system from the screen to the exit surface of the eyepiece system.

18 Claims, 34 Drawing Sheets

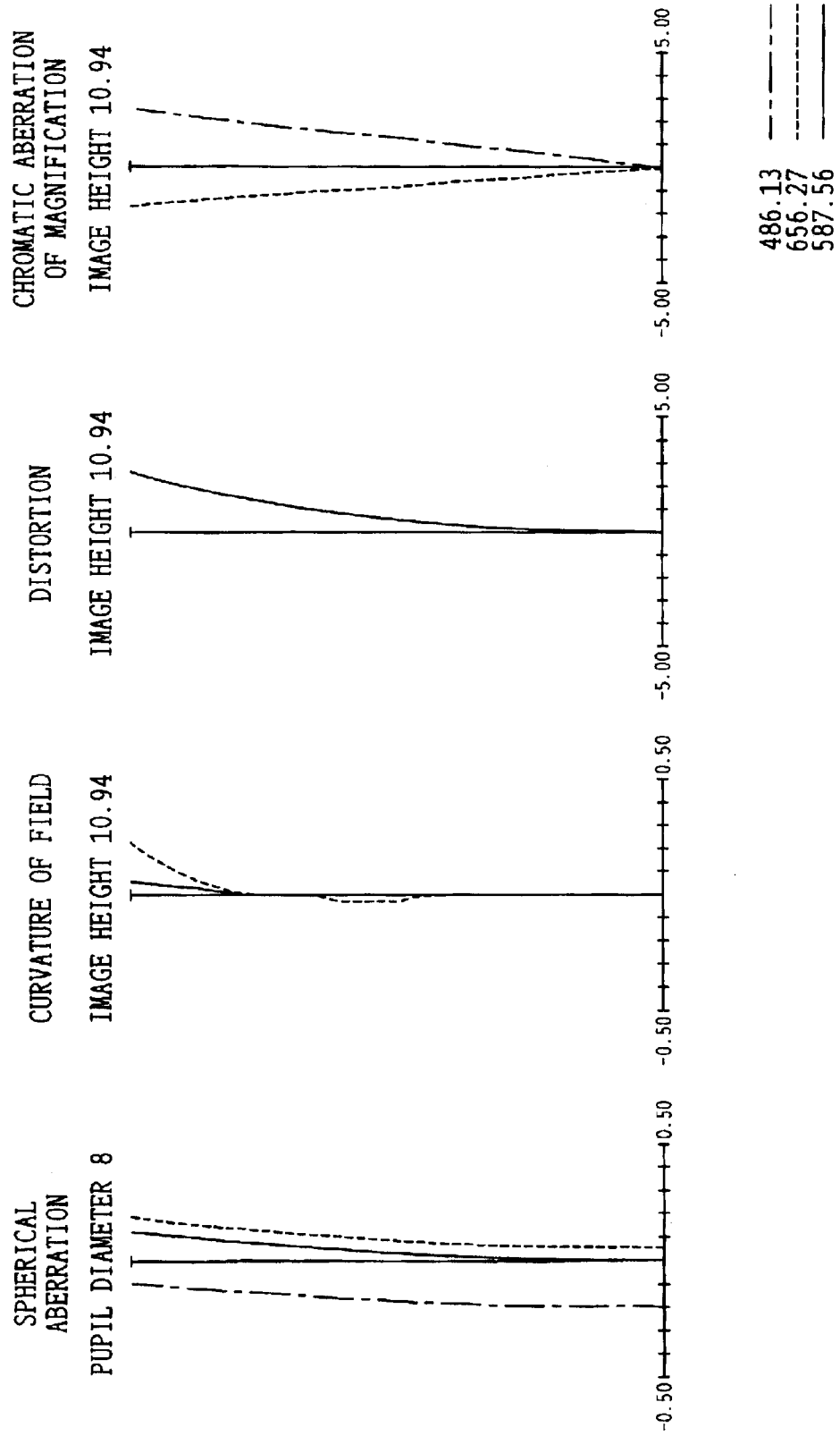

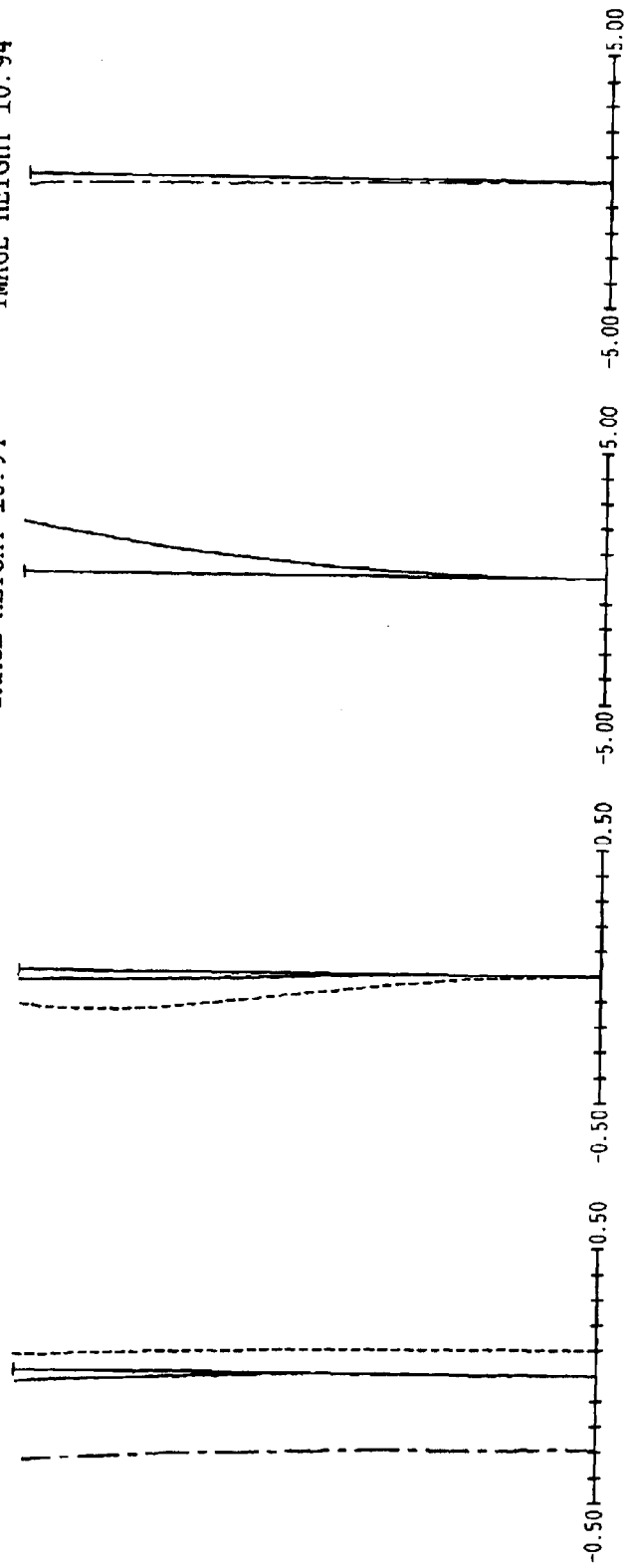

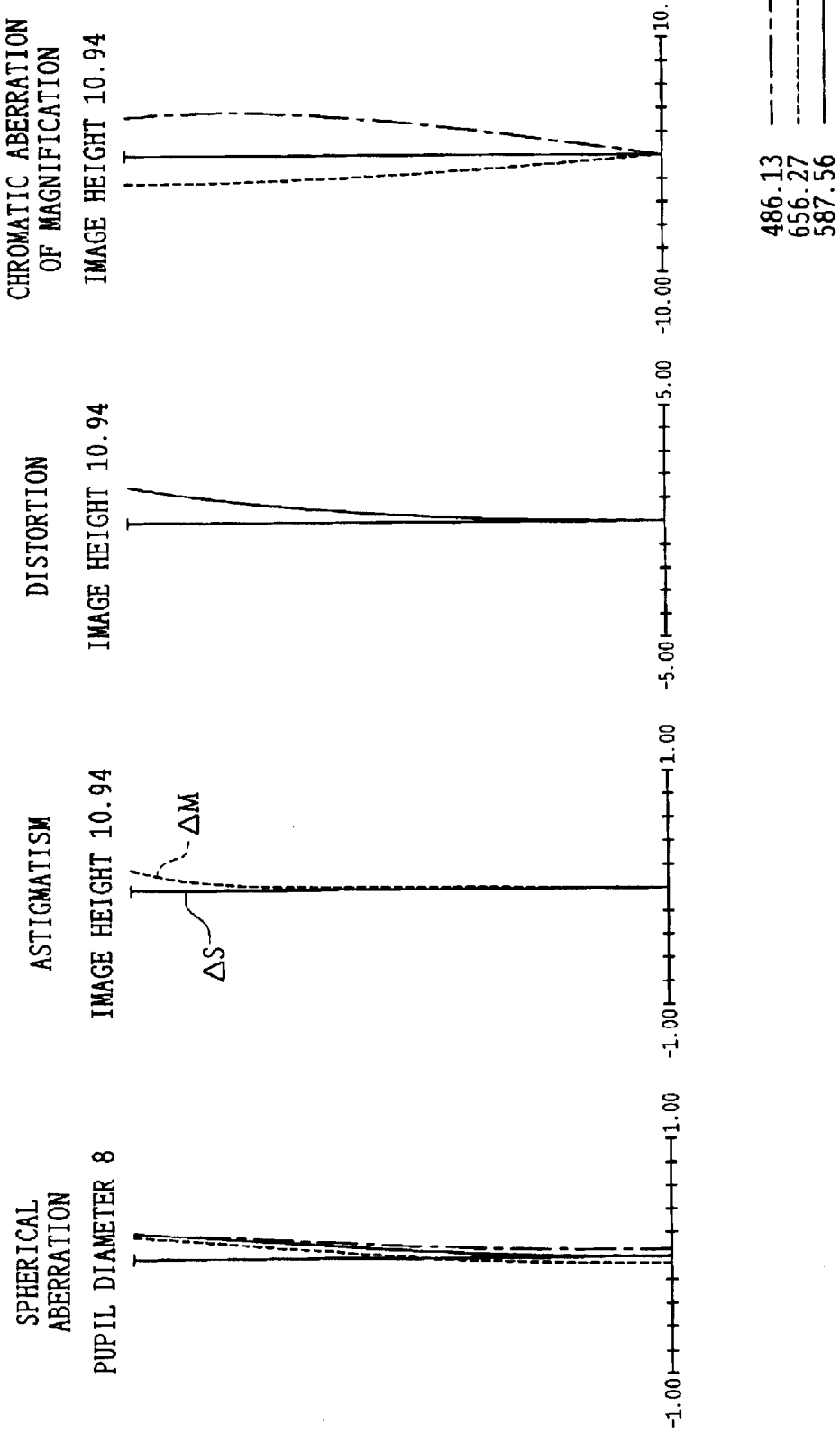

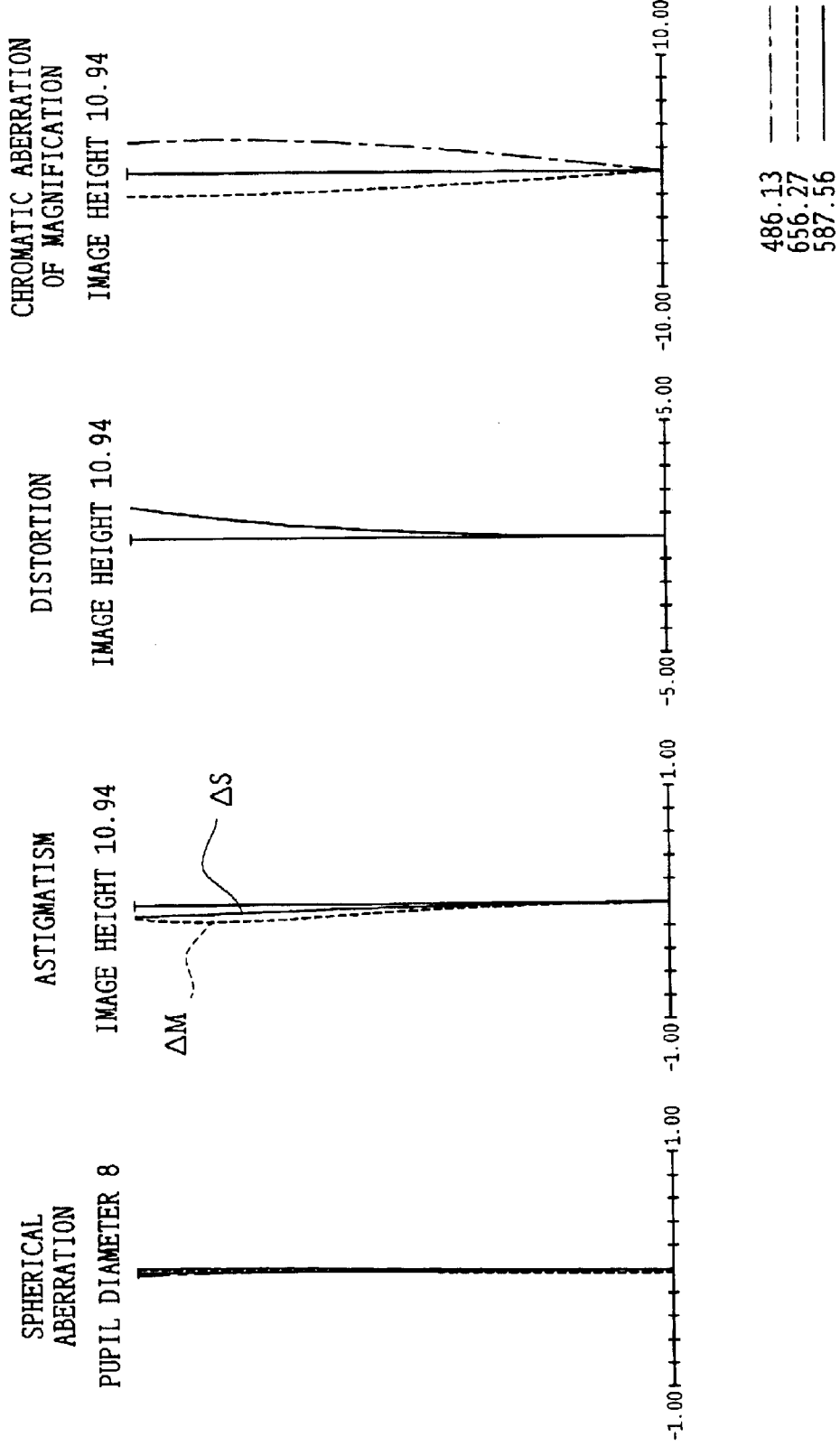

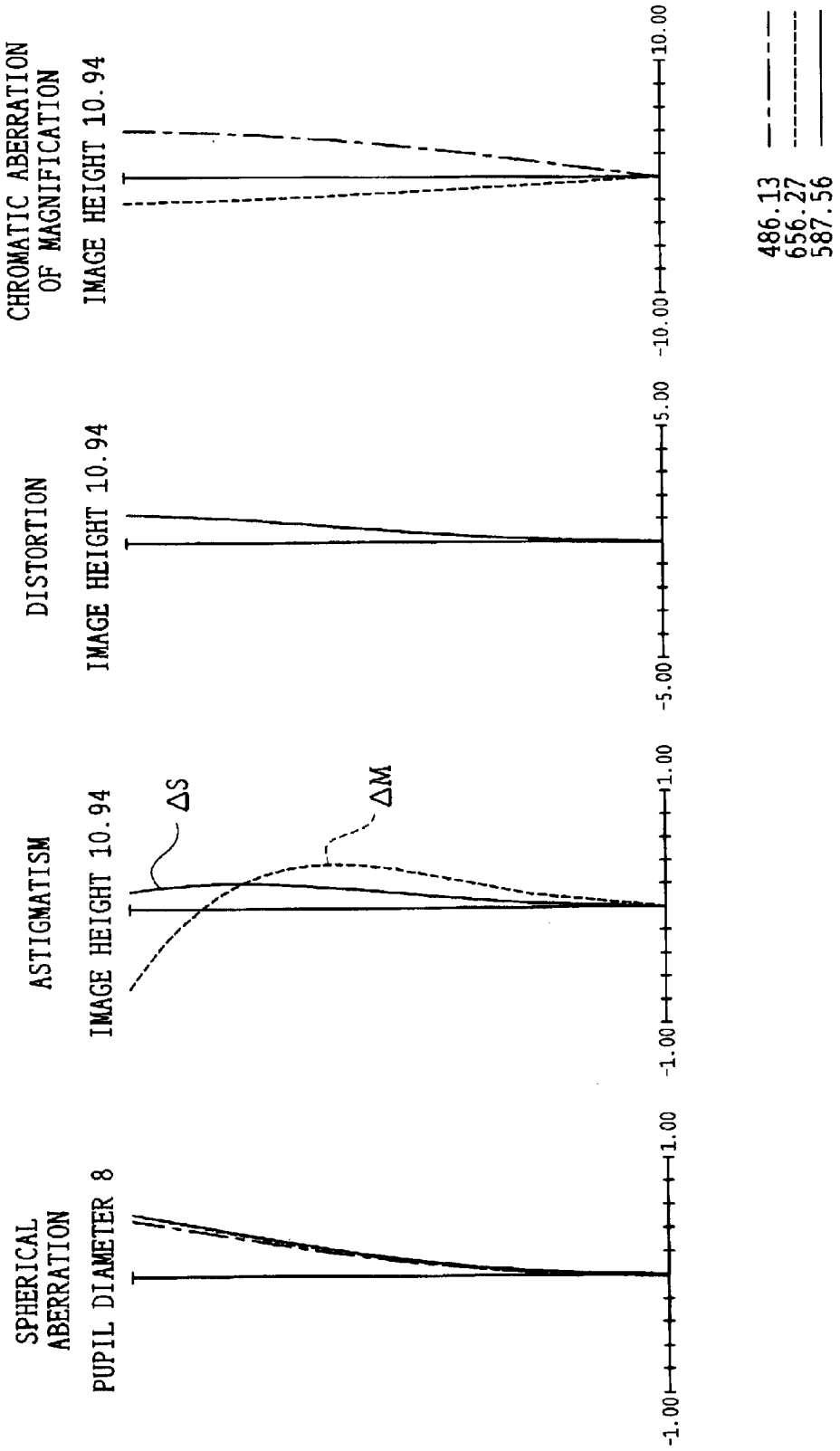

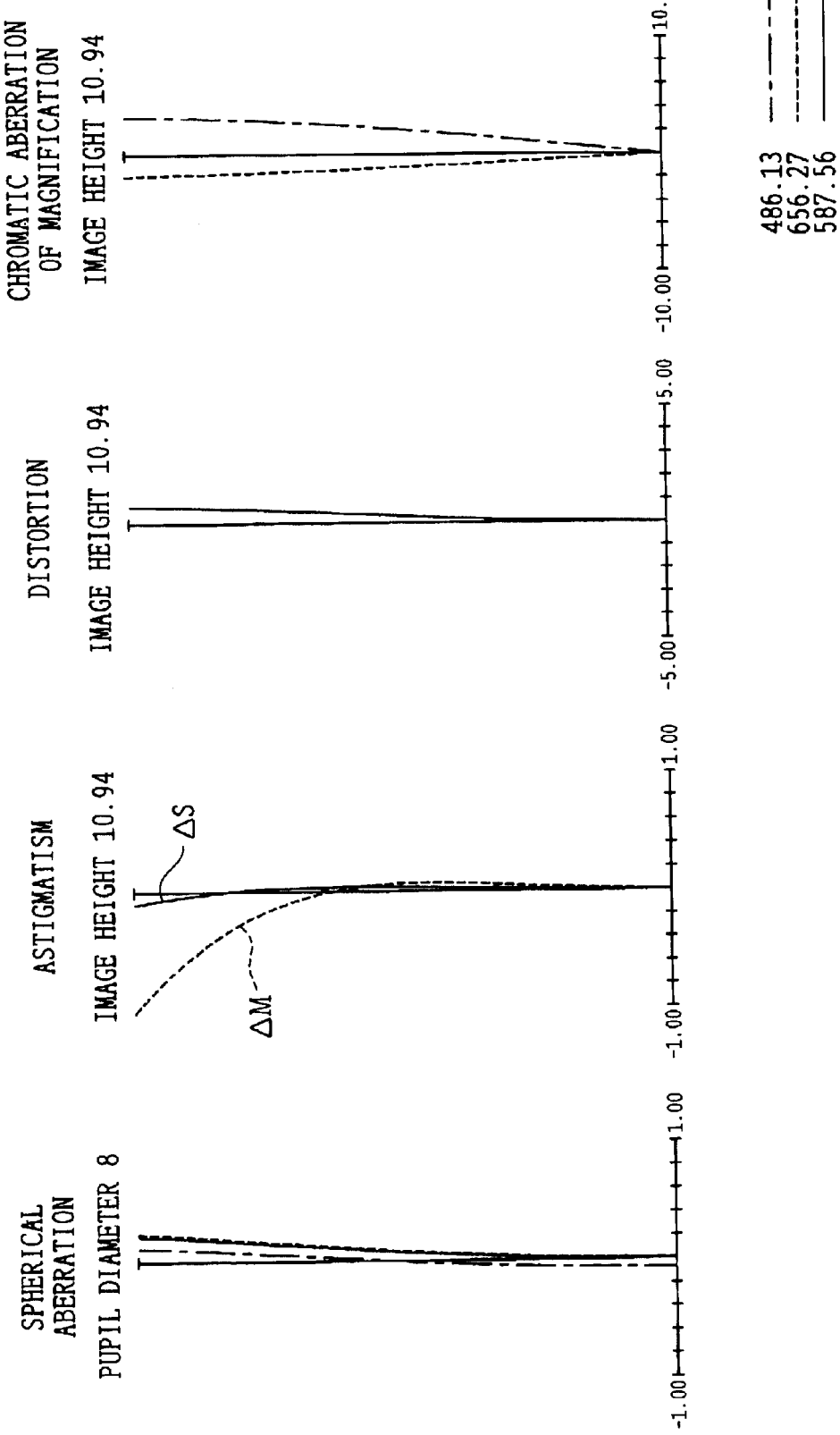

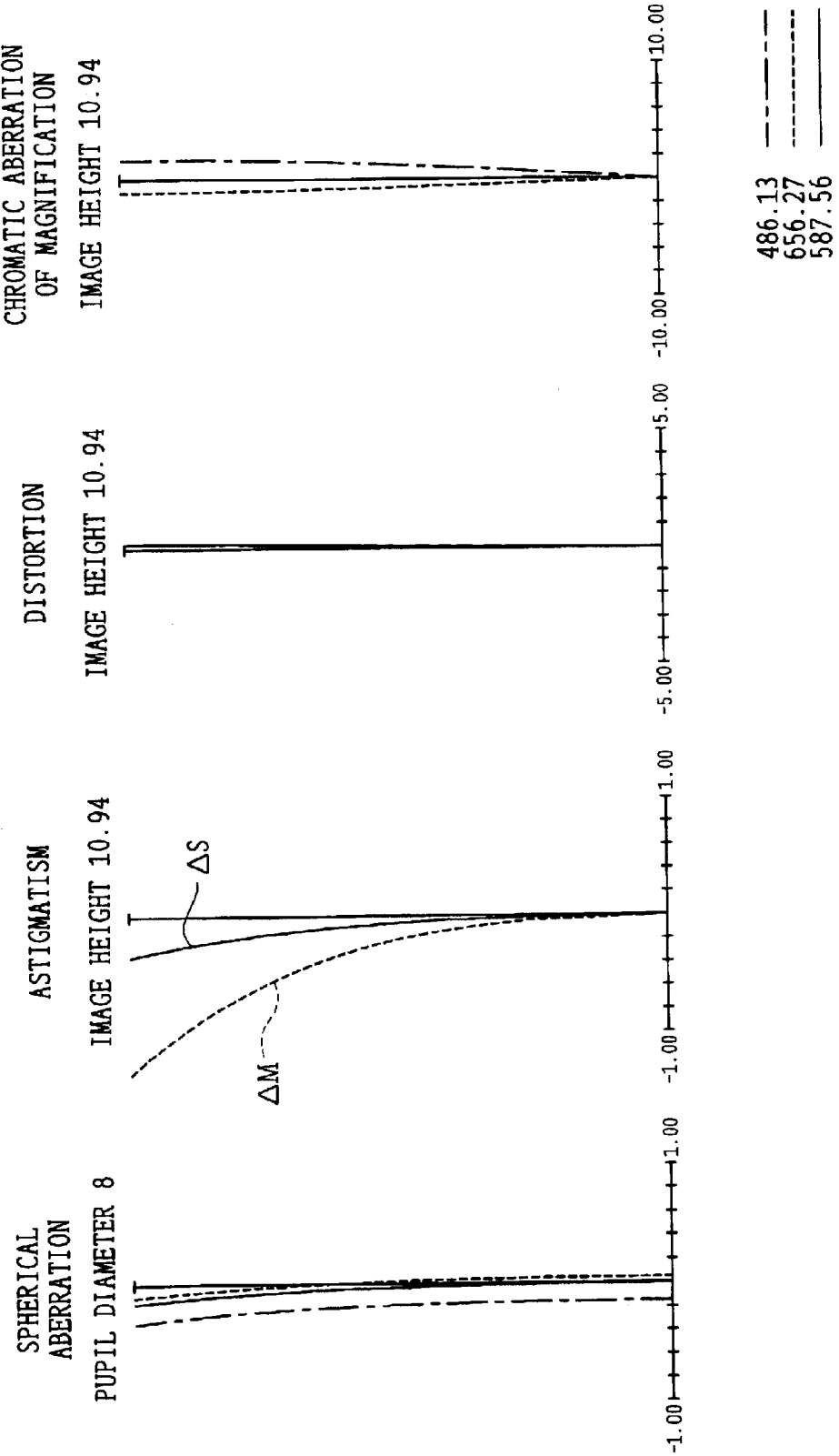

CAMERA PROVIDED WITH EYEPIECE

BACKGROUND OF THE INVENTION

1. Field of the Invention

This invention relates to a camera provided with an eyepiece, and in particular, to a camera having a picture plane of size as small as nearly half of a 135-format film or a silver halide 35-nm film.

2. Description of Related Art

In a camera having a picture plane of small size, when a conventional eyepiece is used as it is, an observation image becomes small and an photographer suffers from undue fatigue in using the camera.

Thus, in order to enable a large image to be observed through a finder, it is necessary to reduce the focal length of the eyepiece and to increase a finder magnification.

Conventional examples in which the focal length of the eyepiece is reduced are disclosed in Japanese Patent Publication Nos. Sho 57-60612 and Hei 7-107581 and Japanese Patent Kokai No. Hei 11-337847.

In order to render a finder easy to see, there is the need to ensure a distance from the eyepiece to the pupil position of an observer as long as possible and to minimize vignetting. In this case also, it becomes necessary to sufficiently increase a distance from an observation plane to a first lens component of the eyepiece.

An eyepiece in which the distance from the observation plane to the entrance surface of the first lens component thereof is longer than the focal length is set forth, for example, in Japanese Patent No. 2726261 in addition to Publication No. Hei 7-107581 mentioned above.

SUMMARY OF THE INVENTION

The present invention provides a single-lens reflex camera which comprises a screen on which an image of an object is projected, a plurality of reflection surfaces for erecting the image on the screen, and an eyepiece system with positive refracting power for observing the image. In this case, the eyepiece system includes, in order from the object side, a first lens component with positive refracting power, a second lens component with positive refracting power, and a third lens component with negative refracting power so that spacings between the first lens component and the second lens component and between the second lens component and the third lens component are changed to thereby make a diopter adjustment, and the single-lens reflex camera satisfies the following conditions:

$$0.15 < \tan(S) < 0.35 \quad (1)$$

$$2.00 < fb/Y < 4.00 \quad (2)$$

$$-0.80 < f3/f < -0.40 \quad (3)$$

where S is an angle, at a diopter of 0 m$^{-1}$, made by the most off-axis chief ray passing through a point on the optical axis at a distance of 23 mm along the optical axis from the exit surface of the third lens component with the optical axis; fb is an air-equivalent length, at a diopter of 0 m$^{-1}$, from the screen to the entrance surface of the first lens component; Y is a diagonal length of the picture plane on the screen; f3 is the focal length of the third lens component; and f is the focal length, at a diopter of 0 m$^{-1}$, of the entire system from the screen to the exit surface of the eyepiece system.

Further, the present invention provides a camera which comprises a screen on which an image of an object is projected, a plurality of reflection surfaces for erecting the image on the screen, and an eyepiece system with positive refracting power for observing the image. In this case, the eyepiece system includes, in order from the object side, a first lens component with positive refracting power, a second lens component with positive refracting power, and a third lens component with negative refracting power so that spacings between the first lens component and the second lens component and between the second lens component and the third lens component are changed to thereby make a diopter adjustment, and the camera satisfies Condition (1) and the following condition:

$$-0.65 < f3/f < -0.45 \quad (4)$$

Still further, the present invention provides a camera which comprises a screen on which an image of an object is projected, a plurality of reflection surfaces for erecting the image on the screen, and an eyepiece system with positive refracting power for observing the image. In this case, the eyepiece system includes, in order from the object side, a first lens component with positive refracting power, a second lens component with positive refracting power, and a third lens component with negative refracting power so that spacings between the first lens component and the second lens component and between the second lens component and the third lens component are changed to thereby make a diopter adjustment, and the camera satisfies Condition (1) and the following condition:

$$15 \text{ mm} < Y < 30 \text{ mm} \quad (5)$$

The present invention provides a camera which comprises a screen on which an image of an object is projected, a plurality of reflection surfaces for erecting the image on the screen, and an eyepiece system with positive refracting power for observing the image. In this case, the eyepiece system includes, in order from the object side, a first lens component with positive refracting power, a second lens component with positive refracting power, and a third lens component with negative refracting power so that spacings between the first lens component and the second lens component and between the second lens component and the third lens component are changed to thereby make a diopter adjustment, and the camera satisfies Condition (1) and the following conditions:

$$2.70 < fb/Y < 3.20 \quad (6)$$

$$-0.80 < f3/f < -0.30 \quad (7)$$

According to the present invention, preferably, each of the first lens component, the second lens component, and the third lens component is constructed with a single lens or a cemented lens.

According to the present invention, preferably, only the second lens component is moved to thereby make a diopter adjustment.

The present invention provides a camera which comprises a screen on which an image of an object is projected, a plurality of reflection surfaces for erecting the image on the screen, and an eyepiece system with positive refracting power for observing the image. In this case, the eyepiece system includes, in order from the object side, a first lens component with positive refracting power, a second lens component with positive refracting power, and a third lens component with negative refracting power, and the camera satisfies the following conditions:

$$2.5 < fb'/Y < 4.0 \quad (8)$$

$$-1.0 < f3/f' < -0.2 \quad (9)$$

$$0.4 < f1/f' < 0.95 \quad (10)$$

where fb' is an air-equivalent length, at a diopter of −0.5 ($m^{-1}$), from the screen to the entrance surface of the first lens component; f' is the focal length of the entire system from the screen to the exit surface of the eyepiece system at a diopter of −0.5 ($m^{-1}$); and f1 is the focal length of the first lens component.

The present invention provides a camera which comprises a screen on which an image of an object is projected, a plurality of reflection surfaces for erecting the image on the screen, and an eyepiece system with positive refracting power for observing the image. In this case, the eyepiece system includes, in order from the object side, a first lens component with positive refracting power, a second lens component with positive refracting power comprised of a single meniscus lens element with a convex surface directed toward the object side, and a third lens component with negative refracting power as a whole in which the refracting power of a pupil-side surface is stronger than that of an object-side surface, and the camera satisfies Conditions (8), (9), and (10).

In the present invention, instead of the screen on which the image of the object is projected, the camera may be provided with an electronic viewfinder which includes a liquid crystal display element having an image plane for displaying the image of the object.

Alternatively, in the present invention, instead of the screen on which the image of the object is projected, the camera may be provided with a finder which includes an objective optical system forming the image plane of the object.

In these cases, Y becomes Y' (a diagonal length of a picture plane on the image plane), fb becomes f''b (an air-equivalent length from the image plane to the entrance surface of the first lens component at a diopter of 0 ($m^{-1}$)), fb' becomes f''b' (an air-equivalent length from the image plane to the entrance surface of the first lens component at a diopter of −0.5 ($m^{-1}$)), f becomes f'' (the focal length, at a diopter of 0 ($m^{-1}$), of the entire system from the image plane to the exit surface of the eyepiece system), and f' becomes f''' (the focal length, at a diopter of −0.5 ($m^{-1}$), of the entire system from the image plane to the exit surface of the eyepiece system).

These and other features and advantages of the present invention will become apparent from the following detailed description of the preferred embodiments when taken in conjunction with the accompanying drawings.

BRIEF DESCRIPTION OF THE DRAWINGS

FIGS. 10A, 10B, 10C, and 10D are diagrams showing aberration characteristics at a diopter of 0 $m^{-1}$ in the second embodiment;

FIGS. 11A, 11B, 11C, and 11D are diagrams showing aberration characteristics at a diopter of −3 $m^{-1}$ in the second embodiment;

FIGS. 29A, 29B, 29C, and 29D are diagrams showing aberration characteristics at a diopter of $+1$ m$^{-1}$ in the seventh embodiment;

FIGS. 30A, 30B, 30C, and 30D are diagrams showing aberration characteristics at a diopter of $-0.5$ m$^{-1}$ in the seventh embodiment;

FIGS. 33A, 33B, 33C, and 33D are diagrams showing aberration characteristics at a diopter of $+1$ m$^{-1}$ in the eighth embodiment;

FIGS. 34A, 34B, 34C, and 34D are diagrams showing aberration characteristics at a diopter of $-0.5$ m$^{-1}$ in the eighth embodiment; and FIGS. 35A, 35B, 35C, and 35D are diagrams showing aberration characteristics at a diopter of $-3$ m$^{-1}$ in the eighth embodiment.

DETAILED DESCRIPTION OF THE PREFERRED EMBODIMENTS

Figure 1:
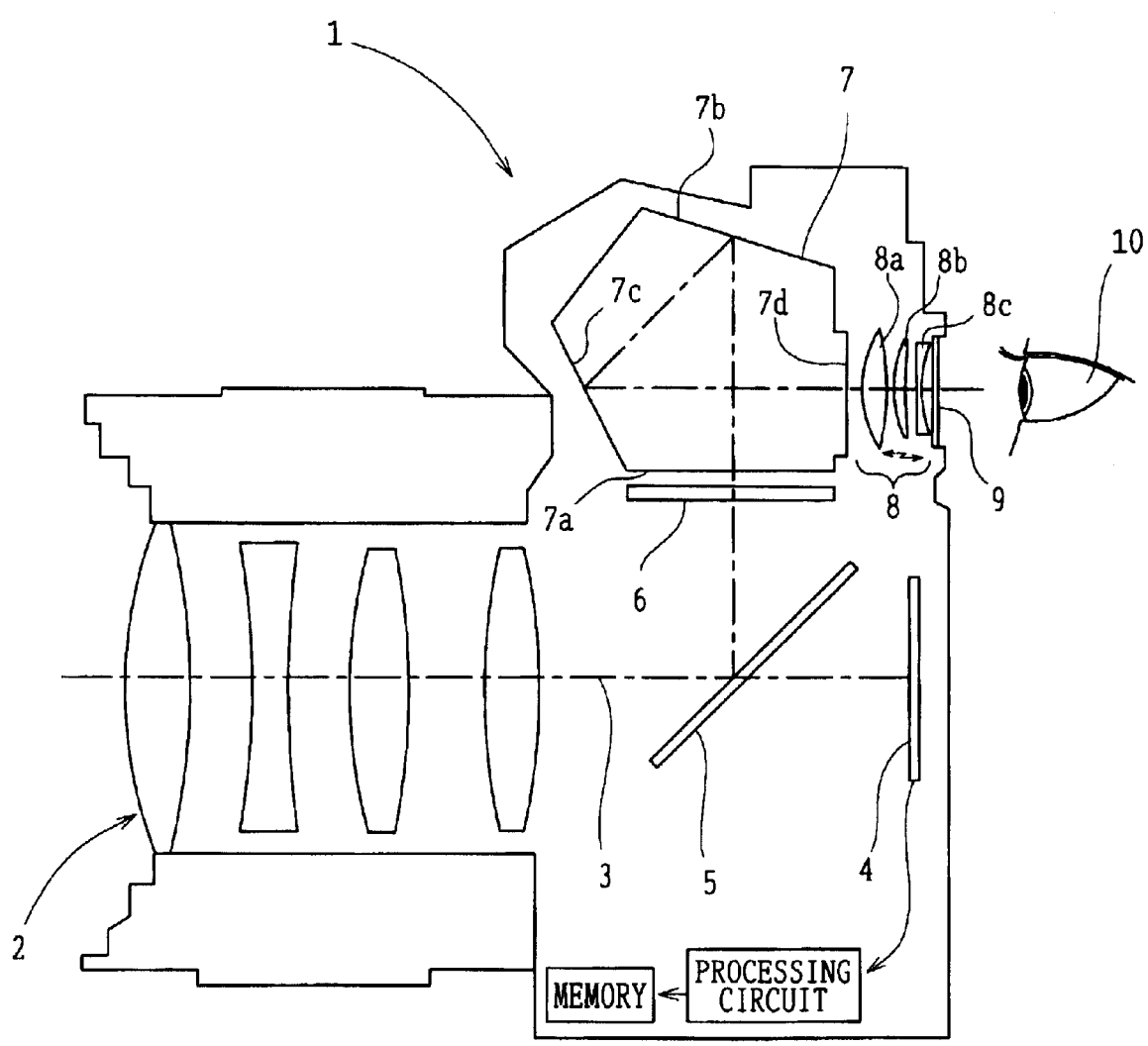
FIG. 1 is a view showing schematically a camera according to the present invention.

Before undertaking the description of the embodiments, the function of the present invention will be explained.

In order to increase the magnification of a finder system, it is only necessary to reduce the focal length of the eyepiece. On the other hand, however, an optical path length must be ensured in order to construct an image erecting system.

Since the camera provided with the eyepiece to which the present invention is applied has a high magnification and a considerable optical path length, it becomes difficult to construct the eyepiece. Furthermore, the size of the picture plane is small and hence the angle of emergence of light from the pupil is also small.

Thus, in order to increase the angle of emergence and facilitate the observation of an object through the finder, the present invention is designed to satisfy Condition (1).

In Condition (1), it is assumed that the pupil position of the observer is located at a distance of 23 mm along the optical axis from the exit surface of the third lens component, and the maximum angle of emergence at this position is represented by S.

If the upper limit of Condition (1) is exceeded, it becomes difficult to completely correct aberration with a small number of lenses. Below the lower limit of Condition (1), the picture plane is so small that it becomes hard to see the object through the finder.

In order to satisfy the condition of the angle of emergence in Condition (1) and secure the optical path length for providing a plurality of reflection surfaces erecting the image, it is necessary to construct an optical system in which a front focal length is basically longer than the focal length.

Thus, in the present invention, the eyepiece is designed to include, in order from the object side, a first lens component with positive refracting power, a second lens component with positive refracting power, and a third lens component with negative refracting power, and an optical system in which a distance from the entrance surface of the first lens component to the screen is longer than the focal length is achieved. Whereby, layout flexibility of the reflection surfaces can be secured.

In addition to such a basic construction, when the present invention is designed to satisfy at least one of Conditions (2), (7), and (5), a finder system through which the object is more favorably seen can be constructed.

Condition (2) prescribes a favorable air-equivalent length from the screen to the entrance surface of the first lens component.

In general, an image erecting optical system, such as a pentagonal roof prism or a pentagonal roof mirror, is placed in space between the screen and the entrance surface of the first lens component. Hence, the optical path length sufficient to place such a prism or mirror without any problem in the space between the screen and the entrance surface of the first lens component becomes necessary.

Below the lower limit of Condition (2), reflection surfaces are liable to cause interference. In the finder, on the other hand, an indication member is often placed on the periphery of the picture plane, and the optical path length which is long accordingly is required. As such, beyond the upper limit of Condition (2), it becomes difficult to completely correct aberration with a small number of lenses.

Condition (7) determines the focal length of the third lens component in order to hold the balance between correction for aberration and the security of the optical path length.

Below the lower limit of Condition (7) to weaken the negative refracting power, it becomes difficult to ensure the optical path length. Beyond the upper limit of Condition (7) to strengthen the negative refracting power, it becomes difficult to completely correct aberration with a small number of lenses.

Condition (5) determines the diagonal length of the picture plane suitable for the construction of the eyepiece mentioned above. Below the lower limit of Condition (5), it becomes difficult to obtain a desired field angle with a small number of lenses. Beyond the upper limit of condition (5), even though the construction of the eyepiece mentioned above is not used, a satisfactory field angle and correction for aberration can be obtained. However, since the size of the picture plane is increased, compactness of the entire camera is highly limited.

In the diopter adjustment, when spacings between the first lens component and the second lens component and between the second lens component and the third lens component are changed for the diopter adjustment, the fluctuation of aberration caused by the diopter adjustment can be suppressed.

In order to make the diopter adjustment, only the second lens component may be moved. In this case, the lens components located before and behind the second lens component which is a moving lens unit are fixed and, for example, spacings between these lens components are hermetically sealed. Whereby, dust penetration into the finder can be prevented.

When the optical system is designed to move the second lens component alone, the first lens component is fixed, and other members (for example, a part of a stroboscopic contact mechanism and a part of a field indicating mechanism) can be placed in space surrounding this lens component. This is favorable for compactness.

In the lens arrangement of the eyepiece, when each of the first, second, and third lens components is constructed with a single lens or a cemented lens, correction for aberration and the security of the optical path length are completely achieved with a small number of lenses.

Furthermore, when the first lens component is configured into a biconvex shape, the second lens component is configured into a meniscus shape with a convex surface directed toward the object side or a biconvex shape, and the third lens component is configured into a shape such that the absolute value of a radius of curvature of the pupil-side surface is smaller than that of the object-side surface, aberration can be corrected and the construction length of the eyepiece can be reduced, which is favorable.

In order to favorably correct aberration, notably chromatic aberration, it is desirable that at least one of the first lens component and the second lens component is constructed with a cemented lens. In particular, when manufacturing costs are taken into account, it is more desirable that the cemented lens is used for the second lens component which is reduced in lens diameter. In this case, when each of the first and third lens components is constructed with a single lens, the manufacturing costs can be further reduced.

When the second lens component is designed so that its interface has negative refracting power, the exit surface of the second lens component need not necessarily have negative refracting power.

Subsequently, reference is made to favorable numerical limits with respect to Conditions (1), (2), (7), and (5).

In Condition (1), it is more desirable that the lower limit is set to 0.20 or 0.22. It is more desirable that the upper limit is 0.3 or 0.25.

In Condition (2), it is more desirable that the lower limit is 2.70 or 2.95. It is more desirable that the upper limit is 3.0 or 3.20.

For example, it is more desirable to satisfy Condition (6).

In Condition (7), it is more desirable that the lower limit is −0.75 or −0.65. It is more desirable that the upper limit is −0.40, −0.45, or −0.50.

For example, it is more desirable to satisfy any one of Conditions (3) and (4) and the following condition:

$$-0.65 < f3/f < -0.50 \tag{11}$$

In Condition (5), it is more desirable that the lower limit is set to 17 mm or 20 mm. It is more desirable that the upper limit is 26 mm. For example, it is more desirable to satisfy the following condition:

$$20 \text{ mm} < Y < 26 \text{ mm} \tag{12}$$

When the eyepiece is constructed to have, in order from the object side, the first lens component with positive refracting power, the second lens component with positive refracting power, and the third lens component with negative refracting power, the position of the principal point of the eyepiece system can be shifted to the object side by the arrangement made in order of positive, positive, and negative refracting powers, and the distance from the screen to the entrance surface of the first lens component of the eyepiece system can be ensured as a sufficient length.

When the second lens component is constructed with a meniscus lens element having a convex surface directed toward the object side, the position of the principal point of the eyepiece system can be further shifted to the object side. This is more advantageous to ensuring the distance from the screen to the entrance surface of the first lens component of the eyepiece system as a sufficient length.

According to the present invention, the height of an off-axis chief ray passing through the object-side surface of the third lens component is above that of the ray passing through the pupil-side surface thereof. Consequently, when the third lens component is constructed with a lens component having negative refracting power as a whole in which the refracting power of the pupil-side surface is stronger than that of the object-side surface, the whole amount of production of aberration can be minimized.

Subsequently, conditions will be described.

In the camera of the present invention, the image erecting optical system, such as a pentagonal roof prism or a pentagonal roof mirror, is placed in space between the screen and the entrance surface of the first lens component of the eyepiece system. Hence, space sufficient to place such a member without any problem becomes necessary.

It is thus favorable that the distance from the screen to the entrance surface of the first lens component of the eyepiece system satisfies Condition (8).

Below the lower limit of Condition (8), the space between the screen and the entrance surface of the first lens component of the eyepiece system becomes insufficient and the image erecting optical system ceases to be constructed. Beyond the upper limit of Condition (8), aberration cannot be completely corrected.

It is more desirable that the lower limit of Condition (8) is set to 2.8 or 3.0 and the upper limit of Condition (8) is 3.75 or 3.5.

For example, it is more desirable to satisfy one of the following conditions:

$$2.8 < fb'/Y < 4.0 \tag{8-1}$$

$$3.0 < fb'/Y < 3.75 \tag{8-2}$$

As mentioned above, individual lens components are arranged to have positive, positive, and negative refracting powers, and the negative refracting power of the third lens component is strengthened so that the position of the front principal point is shifted to the object side of the eyepiece system. In this way, the distance from the screen to the entrance surface of the first lens component of the eyepiece system is ensured as a sufficient length without increasing the focal length.

In this case, it is favorable to satisfy Condition (9).

Below the lower limit of Condition (9) to weaken the negative refracting power of the third lens component, the effect that the position of the front principal point is shifted to the object side of the eyepiece system is lessened, and the distance from the screen to the entrance surface of the first lens component of the eyepiece system cannot be ensured as a sufficient length.

Beyond the upper limit of Condition (9) to strengthen the negative refracting power of the third lens component, aberration cannot be completely corrected.

It is more desirable that the lower limit of Condition (9) is set to −0.8 or −0.53 and the upper limit is −0.25 or −0.3.

For example, it is more desirable to satisfy one of the following conditions:

$$-0.8 < f3/f' < -0.2 \tag{9-1}$$

$$-0.53 < f3/f' < -0.25 \tag{9-2}$$

In order to impart proper reflecting power to the first lens component, it is favorable to satisfy Condition (10).

Below the lower limit of Condition (10) to strengthen the positive refracting power of the first lens component, it becomes difficult to completely correct aberration. Beyond the upper limit of Condition (10) to weaken the positive refracting power of the first lens component, the ray on the object side of the first lens component becomes high, and thus vignetting is caused by a prism interposed between the screen and the eyepiece system so that an eye relief cannot be lengthened.

It is more desirable that the lower limit of Condition (10) is set to 0.45 or 0.5 and the upper limit is 0.87 or 0.85.

For example, it is more desirable to satisfy one of the following conditions:

$$0.45 < f1/f' < 0.87 \quad (10\text{-}1)$$

$$0.5 < f1/f' < 0.85 \quad (10\text{-}2)$$

According to the present invention, the eyepiece system is designed so that the focal length is reduced and at the same time, the negative refracting power is strengthened to shift the position of the front principal point to the object side of the eyepiece system. Thus, any of individual lens components having positive and negative refracting powers naturally becomes strong in power. Consequently, it becomes difficult to correct axial chromatic aberration caused by maintaining the balance of the refracting power between the lens components with positive refracting powers and the lens component with negative refracting power.

In order to set the distribution of refracting powers among individual lens components so that proper balance is acquired and to correct axial chromatic aberration more effectively, it is favorable that the first lens component or the third lens component is constructed with a cemented lens and the production of chromatic aberrations in individual lens components is kept to a minimum.

It is desirable that, as described later, in view of the movement of the lens component for diopter adjustment, the second lens component is constructed with a single positive meniscus lens to lessen the load of a lens driving system.

When a high eyepoint is realized by the distribution of the refracting powers like the eyepiece of the present invention, the height of the off-axis chief ray passing through the first lens component is liable to increase. Thus, since the difference of the height of the off-axis chief ray between the first lens component with positive refracting power and the third lens component with negative refracting power becomes marked, both lens components are considerably different in the amount of production of chromatic aberration of magnification and it is difficult to correct this aberration. As a result, chromatic aberration of magnification produced in the first lens component remains. In order to keep the amount of this chromatic aberration of magnification to a minimum, it is effective for the first lens component to use a low dispersion glass material. Specifically, it is good practice to use the glass material with an Abbe's number of not less than 80 for the first lens component, preferably not less than 80 nor more than 100, or not less than 81 nor more than 95.

The size of the picture plane of the camera according to the present invention is nearly half of that of a silver halide film.

It is thus desirable that the eyepiece of the present invention satisfies the following condition:

$$16.0 < Y < 28.0 \quad (13)$$

Below the lower limit of Condition (13) to reduce the size of the picture plane, the magnification of the finder must be further increased and a more complicated optical system is required.

Beyond the upper limit of Condition (13) to increase the size of the picture plane, the entire camera becomes bulky, which is unfavorable.

It is more desirable that the lower limit of Condition (13) is set to 18.0 or 20.0 and the upper limit is 27.0 or 26.0.

For example, it is more desirable to satisfy one of the following conditions:

$$18.0 < Y < 27.0 \quad (13\text{-}1)$$

$$20.0 < Y < 26.0 \quad (13\text{-}2)$$

In order to make the diopter adjustment, it is desirable to move the second lens component alone. By doing so, when spacings before and behind the moving lens unit are hermetically sealed by the fixed lens units, dust penetration into the finder can be prevented. Since the first lens component can be fixed, space surrounding the first lens component can be utilized, for example, to place other members.

In the present invention, as mentioned above, the eyepiece system is constructed with three lens components: the first lens component with positive refracting power, the second lens component with positive refracting power, and the third lens component with negative refracting power. Whereby, the distance from the screen to the entrance surface of the first lens component of the eyepiece system is increased.

In this case, when the number of lenses constituting the eyepiece system is four or less, notably four, satisfactory performance is secured and cost can be reduced.

As mentioned above, when the negative refracting power of the third lens component is strengthened to shift the position of the front principal point to the object side of the eyepiece, the distance from the screen to the entrance surface of the first lens component of the eyepiece system is ensured as a sufficient length without increasing the focal length.

In this case, it is desirable that, in the first and second lens components to which positive refracting powers are imparted, the lens components have the loads of refracting powers of nearly the same extent in order to suppress the production of aberration and satisfy the following condition:

$$0.5 < f2/f' < 1.2 \quad (14)$$

where f2 is the focal length of the second lens component.

Below the lower limit of Condition (14), the refracting power of the second lens component is strengthened and the Petzval sum is impaired. When the second lens component is moved to make the diopter adjustment, aberration in each diopter condition fluctuates, and especially fluctuations in spherical aberration and astigmatism are heavy. Consequently, it becomes difficult to properly correct aberration over the whole range of diopter adjustment. Beyond the upper limit of Condition (14), the refracting power of the second lens component is weakened and the height of the off-axis chief ray passing through the first lens component is increased. As a result, off-axis aberration, notably chromatic aberration of magnification, produced in the first lens component becomes considerable, and it becomes difficult to correct such aberration. Since the ray height is increased, vignetting is caused by the prism and a satisfactory eye relief cannot be ensured.

It is more desirable that the lower limit of Condition (14) is set to 0.55 or 0.6 and the upper limit is 1.0 or 1.2. For example, it is more desirable to satisfy one of the following conditions:

$$0.55 < f2/f' < 1.0 \quad (14\text{-}1)$$

$$0.6 < f2/f' < 0.9 \quad (14\text{-}2)$$

In order to strengthen the negative refracting power of the third lens component and to shift the position of the front principal point to the object side of the eyepiece, it is favorable to satisfy the following condition:

$$-1.3 < f12/f3 < -0.9 \quad (15)$$

where f12 is a combined focal length of the first lens component and the second lens component.

Below the lower limit of Condition (15), the negative refraction power of the third lens component becomes so strong that correction for aberration is difficult. Beyond the upper limit of Condition (15), the front principal point cannot be completely shifted to the object side of the eyepiece, and hence it becomes difficult to ensure the distance from the screen to the entrance surface of the first lens component of the eyepiece system as a sufficient length.

It is more desirable that the lower limit of Condition (15) is set to −1.25 or −1.2 and the upper limit is −0.95 or −1.0. For example, it is more desirable to satisfy one of the following conditions:

$$-1.25 < f12/f3 < -0.95 \quad (15\text{-}1)$$

$$-1.2 < f12/f3 < -1.0 \quad (15\text{-}2)$$

In accordance with the drawings, the embodiments of the present invention will be described below.

FIG. 1 shows one embodiment of a camera provided with the eyepiece of the present invention.

A camera 1 of FIG. 1 is designed so that a photographic lens 2 is interchangeable in regard of the camera through a mount, not shown. Also, in the present invention, it is assumed that an apparatus constructed so that, even though the photographic lens is not provided, it can be mounted, is called a camera.

In FIG. 1, reference numeral 4 represents a CCD as an electronic image sensor. In accordance with a signal from the CCD, image processing is performed in a processing circuit, and image information is stored in a memory. In stored image information, an image is displayed by a personal computer, not shown, and the information can be recorded and stored in various information storage media.

Reference numeral 5 denotes a quick-return mirror placed on an optical axis 3 of the photographic lens 2 between the photographic lens 2 and the CCD 4, and 6 denotes a finder screen placed on an optical path reflected by the quick-return mirror 5. The entrance or exit side of this screen is constructed with a ground glass surface.

Reference numeral 7 denotes a pentagonal roof prism. The pentagonal roof prism 7 includes, in order of an arrangement along the optical path, a plane entrance surface 7a, a roof reflection surface 7b, a plane reflection surface 7c, and a plane exit surface 7d.

Reference numeral 8 denotes an eyepiece, which is constructed in accordance with the aspect of each of the embodiments to be described later. On the exit side of the eyepiece 8, a plane-parallel plate 9 is provided as cover glass.

An emerging beam of light is introduced into a pupil 10 of an observer and an image to be photographed is observed.

The camera of the present invention may be constructed so that the photographic lens 2 is integrated with a camera body and is not interchangeable in regard of the camera.

Instead of the CCD 4, a photographing film may also be placed.

Instead of the quick-return mirror 5, a half mirror or a path splitting prism may be used.

In addition to the ground glass surface, the screen 6 may be constructed with a minute-prism array surface or a hologram surface.

A surface opposite to the screen 6 may be constructed with an optical surface having a function of converging light, such as a Fresnel lens surface or a convex surface, so that a function of condensing light on the periphery of the picture plane is improved.

In addition to the pentagonal roof prism 7, a roof mirror may be used together with a plane mirror, or a plurality of reflection surfaces for erecting an image may be separately used.

When a prism is used for the image erecting system, optical refracting power is imparted to its entrance or exit surface, or a field lens is placed close to the screen 6. Whereby, correction for aberration and light-condensing efficiency can be further improved.

In this case, the focal length f of the entire system is a value in which the refracting power of the prism is taken into account. On the other hand, the air-equivalent length fb is the one from the screen 6 to the entrance surface of a first lens component 8a of the eyepiece 8.

The cover glass 9 may or may not be provided. When the cover glass 9 is used, the angle S refers to an angle made by the most off-axis chief ray passing through a point on the optical axis at a distance of 23 mm along the optical axis, over the air-equivalent length, from the exit surface of a third lens component 8c of the eyepiece 8 with the optical axis.

In the diopter adjustment, as in each of the embodiments to be described later, only the second lens component may be moved, or a plurality of lens components may be moved.

Figure 2:
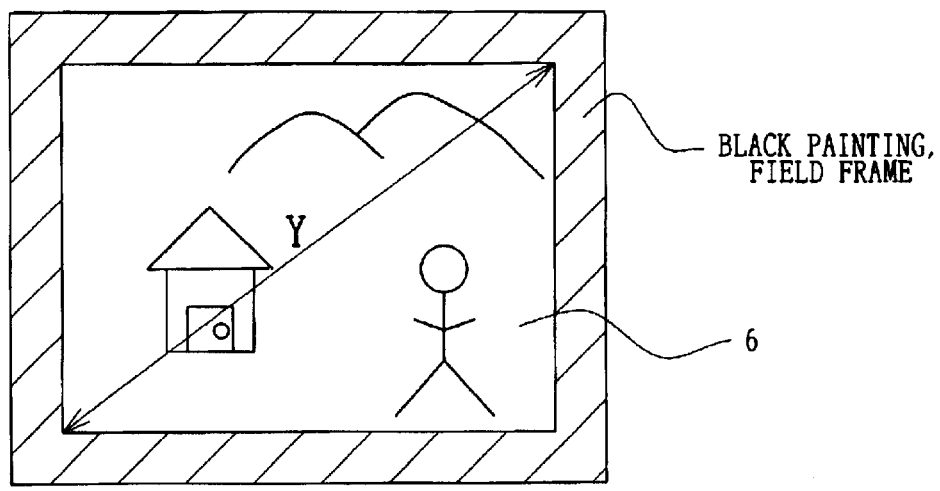
FIG. 2 is an explanatory view of the screen of the camera according to the present invention.
Figure 3:
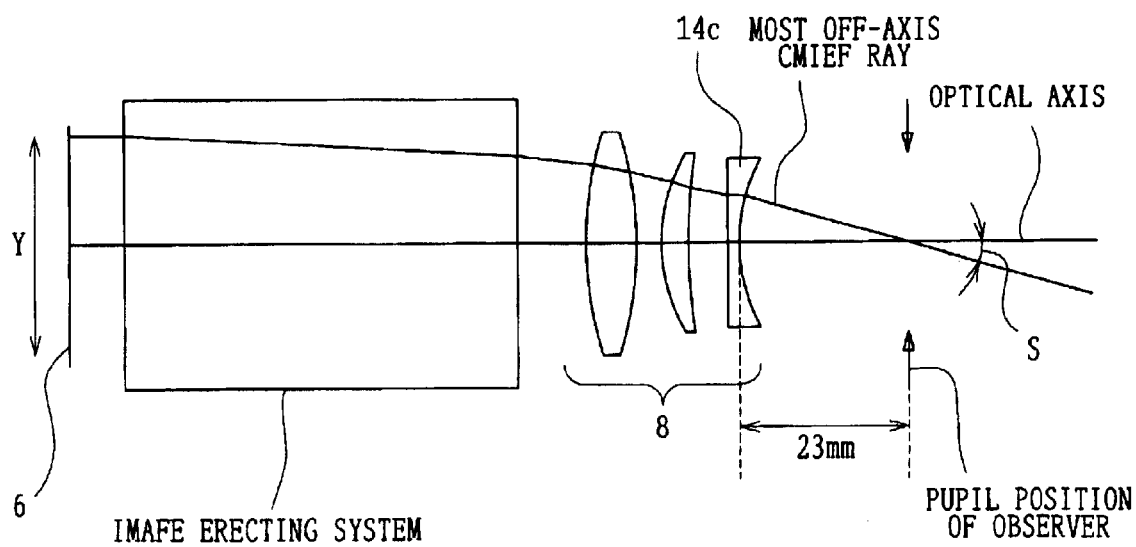
FIG. 3 is an explanatory view of an angle defined by a condition in the present invention.

FIGS. 2 and 3 depict various factors of the conditions in the present invention. FIG. 2 shows the screen 6 constructed with the ground glass surface. On or in the proximity of the screen 6, provision for limiting a field range (for example, black painting or the mounting of a field frame) is made. Also, symbol Y denotes the diagonal length of the picture plane in an observable range on the screen 6.

FIG. 3 illustrates the angle S. In this figure, the maximum field angle where the observer's pupil is located at a distance of 23 mm form the exit surface of the third lens component is represented by S. That is, S is an angle made by the most off-axis chief ray passing through a point on the optical axis at a distance of 23 mm along the optical axis from the exit surface of the third lens component 8c of the eyepiece 8 with the optical axis.

Instead of the screen 6, a liquid crystal display (LCD) which has an image plane displaying an image of an object may be used as an electronic viewfinder. In this case, image information from the CCD 4 is displayed on the LCD.

First Embodiment

Figure 4:
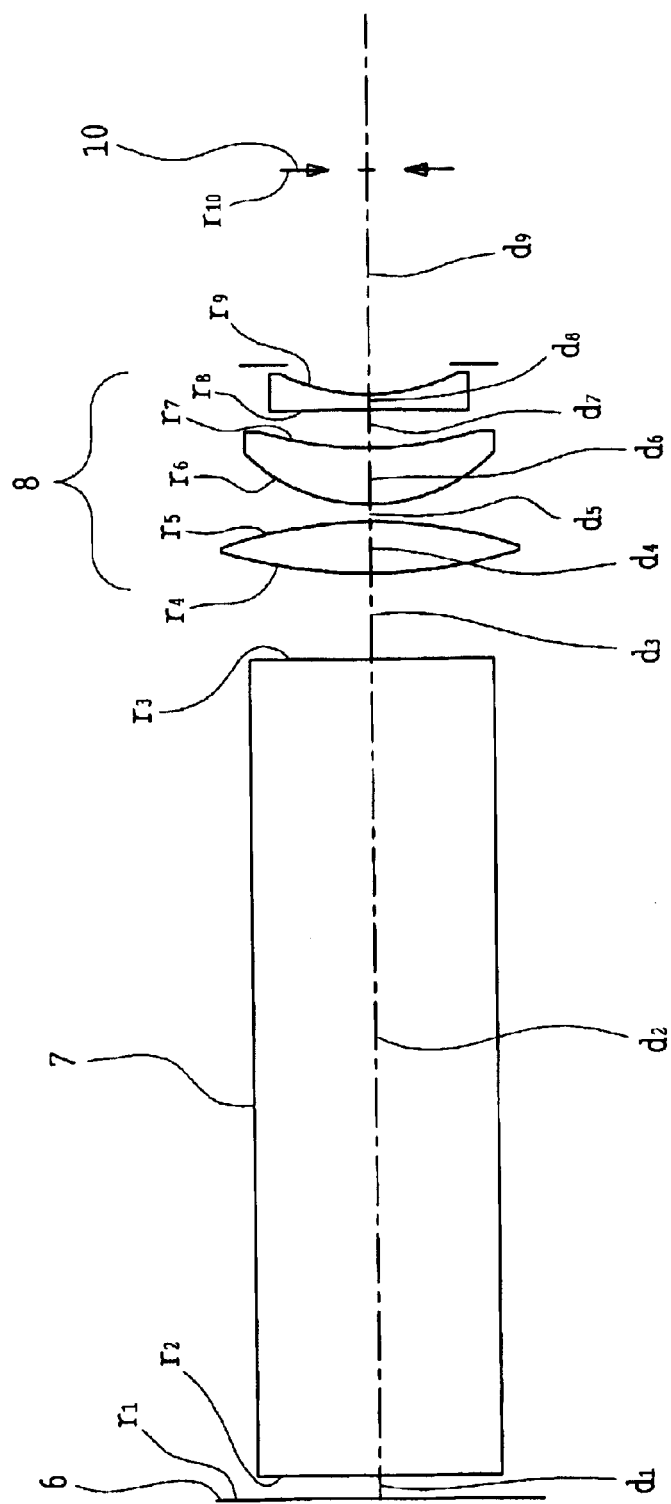
FIG. 4 is a sectional view showing an optical arrangement, developed along the optical axis, at a diopter of 0 $m^{-1}$, in a first embodiment of an eyepiece optical system used in the camera according to the present invention.
Figure 5:
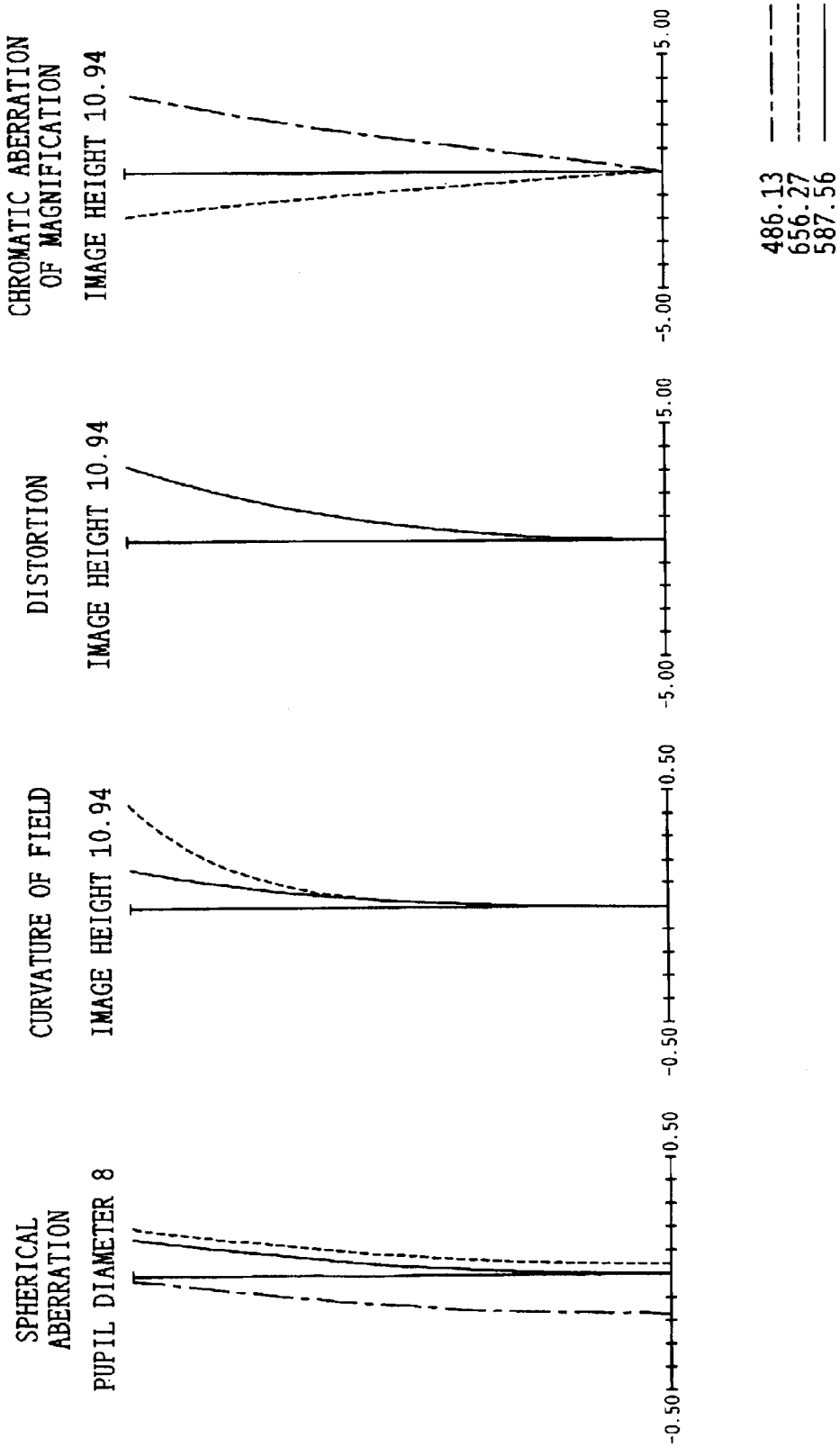
FIGS. 5A, 5B, 5C, and 5D are diagrams showing aberration characteristics at a diopter of +1 $m^{-1}$ in the first embodiment.
Figure 6:
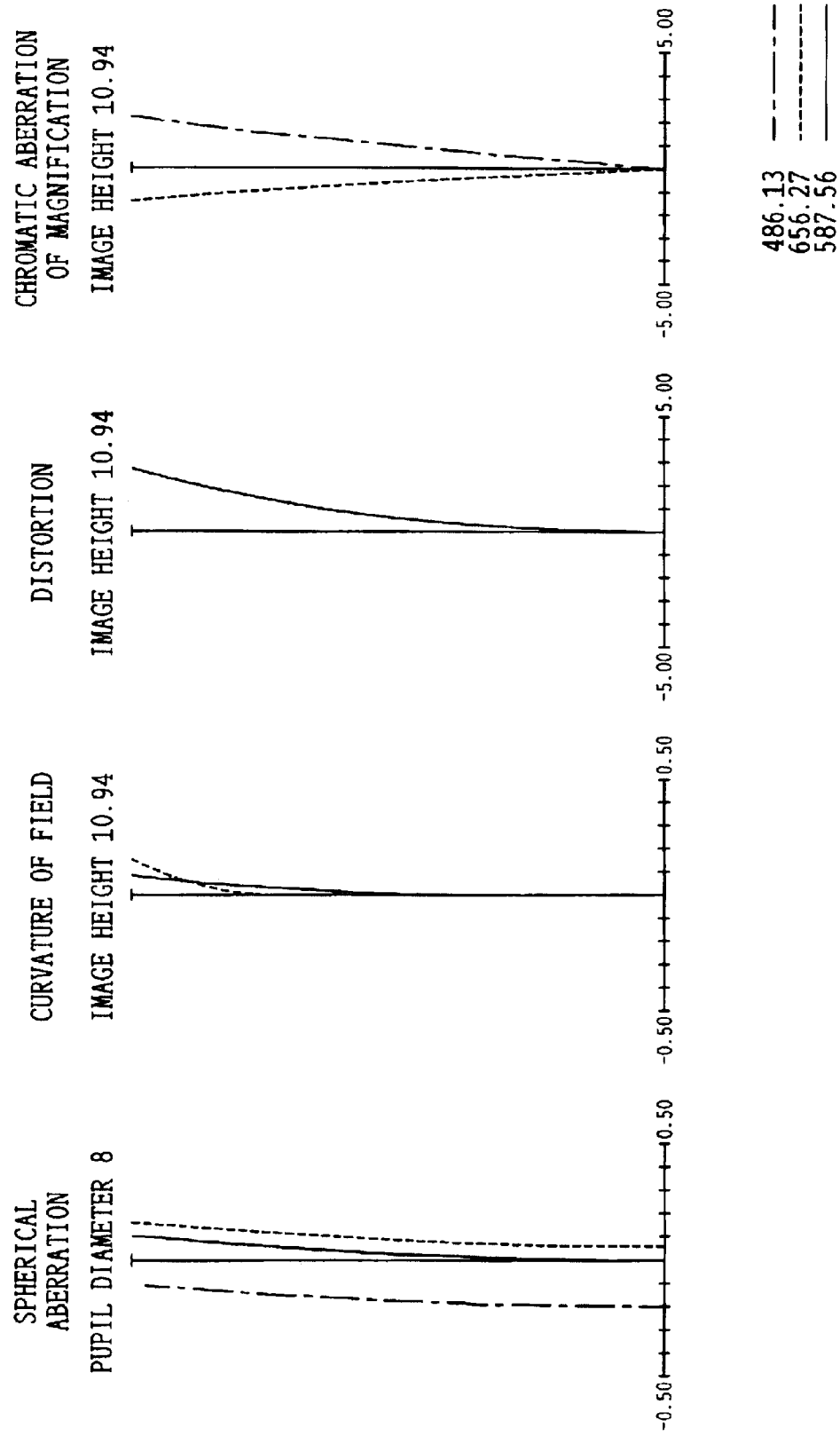
FIGS. 6A, 6B, 6C, and 6D are diagrams showing aberration characteristics at a diopter of 0 $m^{-1}$ in the first embodiment.
Figure 7:
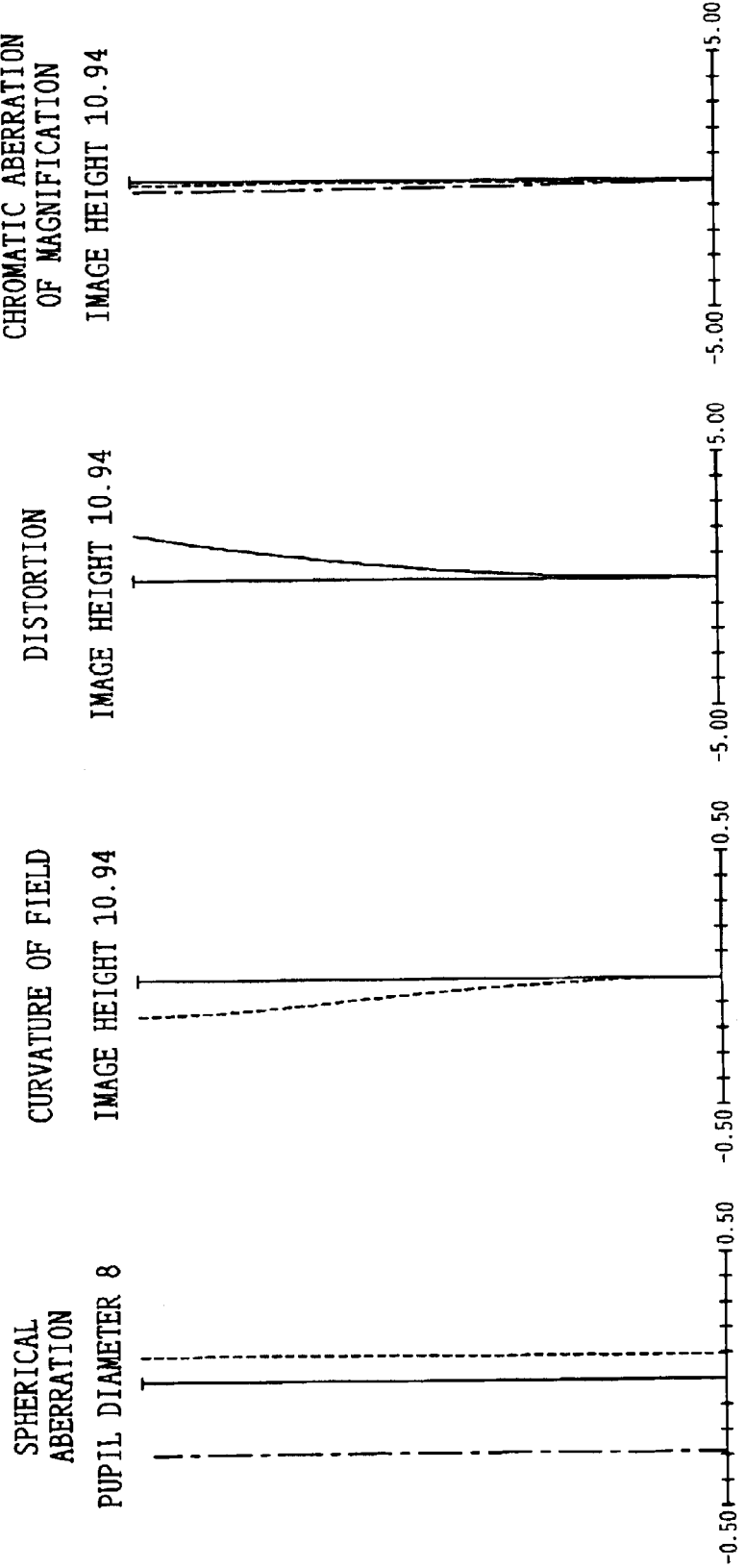
FIGS. 7A, 7B, 7C, and 7D are diagrams showing aberration characteristics at a diopter of −3 $m^{-1}$ in the first embodiment.

FIG. 4 shows an optical arrangement, at a diopter of 0 m$^{-1}$, in the first embodiment of a camera provided with the eyepiece according to the present invention. For convenience of illustration, a plane-parallel plate-like member in FIG. 4 is shown by developing the pentagonal roof prism.

FIGS. 5A–5D, 6A–6D, and 7A–7D show aberration characteristics in the first embodiment. Also, the diopter (m$^{-1}$) is taken as the axis of abscissas relative to spherical aberration and curvature of field, and the angle (minute) is taken as the axis of abscissas relative to chromatic aberration of magnification.

The first embodiment has the pentagonal roof prism 7 and the eyepiece system 8. The eyepiece system 8 includes, in order from the object side, a first lens component 8a with positive refracting power which is a biconvex lens, a second lens component 8b with positive refracting power which is a meniscus lens with a convex surface directed toward the object side, and a third lens component 8c with negative refracting power which is a biconcave lens. The diopter adjustment is made by moving the second lens component 8b.

Subsequently, numerical data of optical members constituting the eyepiece system of the first embodiment are shown below.

In the numerical data of the first embodiment, $r_1, r_2, \ldots$ denote radii of curvature of surfaces of individual lenses and a prism; $d_1, d_2, \ldots$ denote thicknesses of individual lenses and the prism, or air spacings between them; $n_{d1}, n_{d2}, \ldots$ denote refractive indices of individual lenses and the prism at the d line; $\nu_{d1}, \nu_{d2}, \ldots$ denote Abbe's numbers of individual lenses and the prism; and fl denotes the focal length of the entire system from the screen to the exit surface of the eyepiece.

Also, these symbols are also used for the numerical data of other embodiments to be described later.

Numerical Data 1

Diopter $(m^{-1})$ = +1 ~ 0 ~ −3
fl (mm) = 47.62 ~ 50.00 ~ 60.75
Pupil diameter (mm) = 8
Diagonal length Y (or Y') (mm) = 22.2

| | | | |
|---|---|---|---|
| $r_1 = \infty$ | | | |
| | $d_1 = 2.50$ | | |
| $r_2 = \infty$ | | | |
| | $d_2 = 82.40$ | $n_{d2} = 1.51633$ | $\nu_{d2} = 64.14$ |
| $r_3 = \infty$ | | | |
| | $d_3 = 9.00$ | | |
| $r_4 = 69.592$ | | | |
| | $d_4 = 4.95$ | $n_{d4} = 1.62041$ | $\nu_{d4} = 60.29$ |
| $r_5 = -48.494$ | | | |
| | $d_5 = D5$ | | |
| $r_6 = 21.408$ | | | |
| | $d_6 = 5.07$ | $n_{d6} = 1.77250$ | $\nu_{d6} = 49.60$ |
| $r_7 = 51.041$ | | | |
| | $d_7 = D7$ | | |
| $r_8 = -436.870$ | | | |
| | $d_8 = 1.50$ | $n_{d8} = 1.80518$ | $\nu_{d8} = 25.42$ |
| $r_9 = 21.601$ | | | |
| | $d_9 = 23.00$ | | |
| $r_{10} = $ Pupil | | | |

| Diopter $(m^{-1})$ = | +1 | ~ 0 | ~ −3 |
|---|---|---|---|
| D5 | 1.000 | 1.655 | 4.073 |
| D7 | 4.073 | 3.417 | 1.000 |

Second Embodiment

Figure 8:
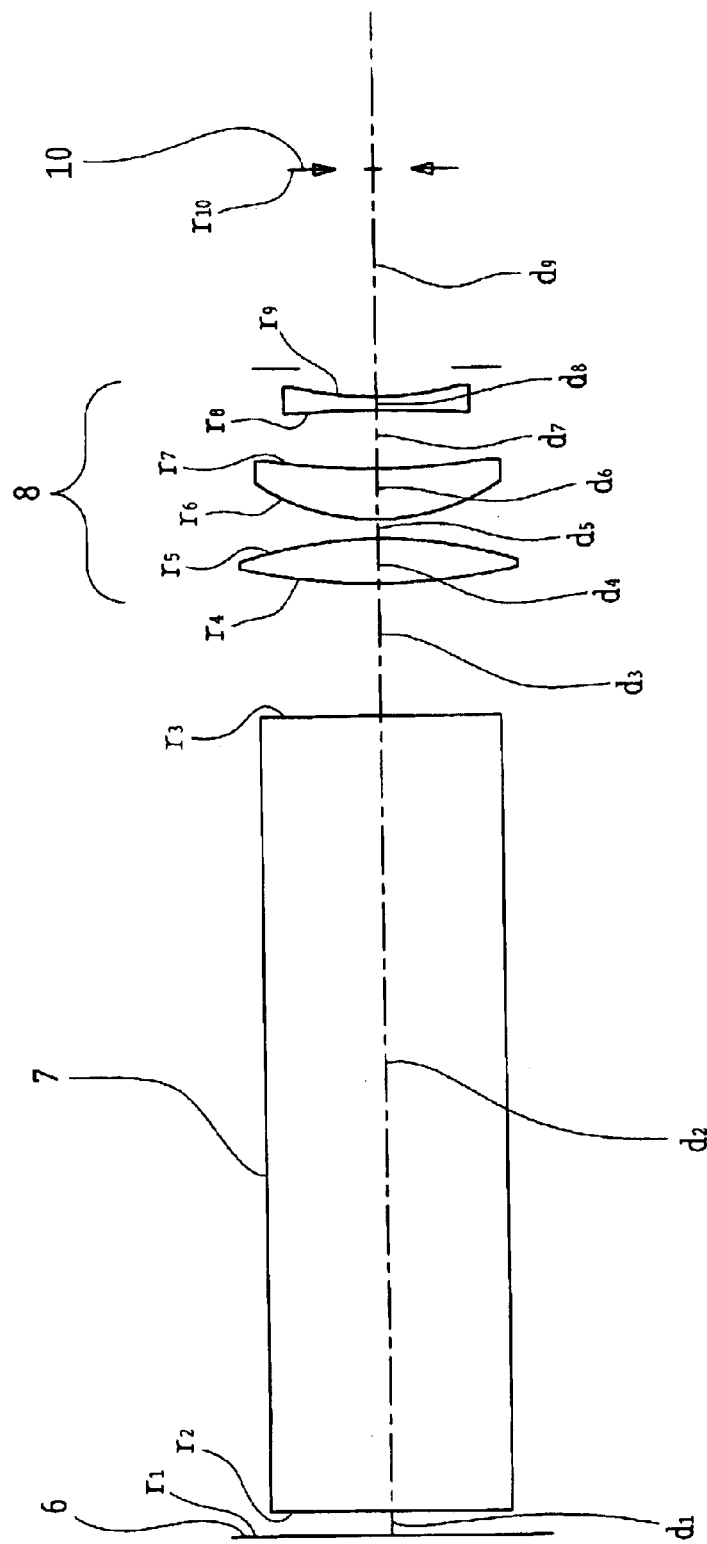
FIG. 8 is a sectional view showing an optical arrangement, developed along the optical axis, at a diopter of 0 $m^{-1}$, in a second embodiment of an eyepiece optical system used in the camera according to the present invention.
Figures 9A, 9B, 9C, 9D:
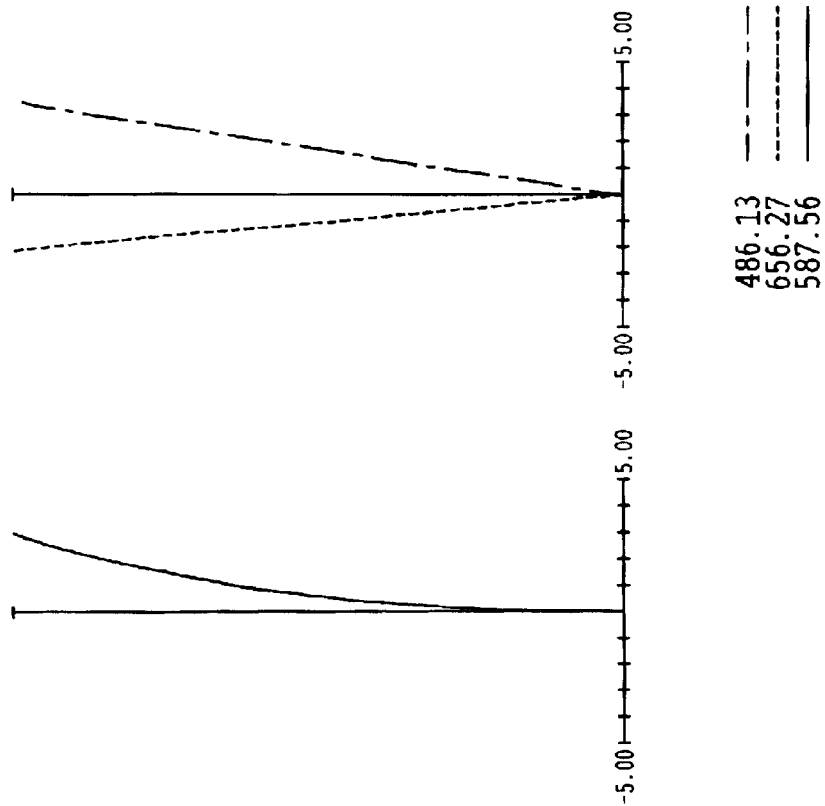
FIGS. 9A, 9B, 9C, and 9D are diagrams showing aberration characteristics at a diopter of +1 $m^{-1}$ in the second embodiment.

FIG. 8 shows an optical arrangement, at a diopter of 0 $m^{-1}$, in the second embodiment of the eyepiece system according to the present invention. For convenience of illustration, a plane-parallel plate-like member in FIG. 8 is shown by developing the pentagonal roof prism.

FIGS. 9A–9D, 10A–10D, and 11A–11D show aberration characteristics in the second embodiment. Also, the diopter $(m^{-1})$ is taken as the axis of abscissas relative to spherical aberration and curvature of field, and the angle (minute) is taken as the axis of abscissas relative to chromatic aberration of magnification.

The second embodiment has the pentagonal roof prism 7 and the eyepiece system 8. The eyepiece system 8 includes, in order from the object side, the first lens component 8a with positive refracting power which is a biconvex lens, the second lens component 8b with positive refracting power which is a meniscus lens with a convex surface directed toward the object side, and the third lens component 8c with negative refracting power which is a biconcave lens. The diopter adjustment is made by moving the second lens component 8b.

Subsequently, numerical data of optical members constituting the eyepiece system of the second embodiment are shown below.

Numerical Data 2

Diopter $(m^{-1})$ = +1 ~ 0 ~ −3
fl (mm) = 52.41 ~ 55.57 ~ 71.04
Pupil diameter (mm) = 8
Diagonal length Y (or Y') (mm) = 22.2

| | | | |
|---|---|---|---|
| $r_1 = \infty$ | | | |
| | $d_1 = 2.50$ | | |
| $r_2 = \infty$ | | | |
| | $d_2 = 82.40$ | $n_{d2} = 1.51633$ | $\nu_{d2} = 64.14$ |
| $r_3 = \infty$ | | | |
| | $d_3 = 14.00$ | | |
| $r_4 = 92.341$ | | | |
| | $d_4 = 4.44$ | $n_{d4} = 1.60311$ | $\nu_{d4} = 60.64$ |
| $r_5 = -48.162$ | | | |
| | $d_5 = D5$ | | |
| $r_6 = 26.069$ | | | |
| | $d_6 = 4.79$ | $n_{d6} = 1.60311$ | $\nu_{d6} = 60.64$ |
| $r_7 = 96.770$ | | | |
| | $d_7 = D7$ | | |
| $r_8 = -103.060$ | | | |
| | $d_8 = 1.50$ | $n_{d8} = 1.805189$ | $\nu_{d8} = 25.42$ |
| $r_9 = 38.122$ | | | |
| | $d_9 = 23.00$ | | |
| $r_{10} = $ Pupil | | | |

| Diopter $(m^{-1})$ = | +1 | ~ 0 | ~ −3 |
|---|---|---|---|
| D5 | 1.000 | 2.180 | 6.717 |
| D7 | 6.717 | 5.537 | 1.000 |

Third Embodiment

Figure 12:
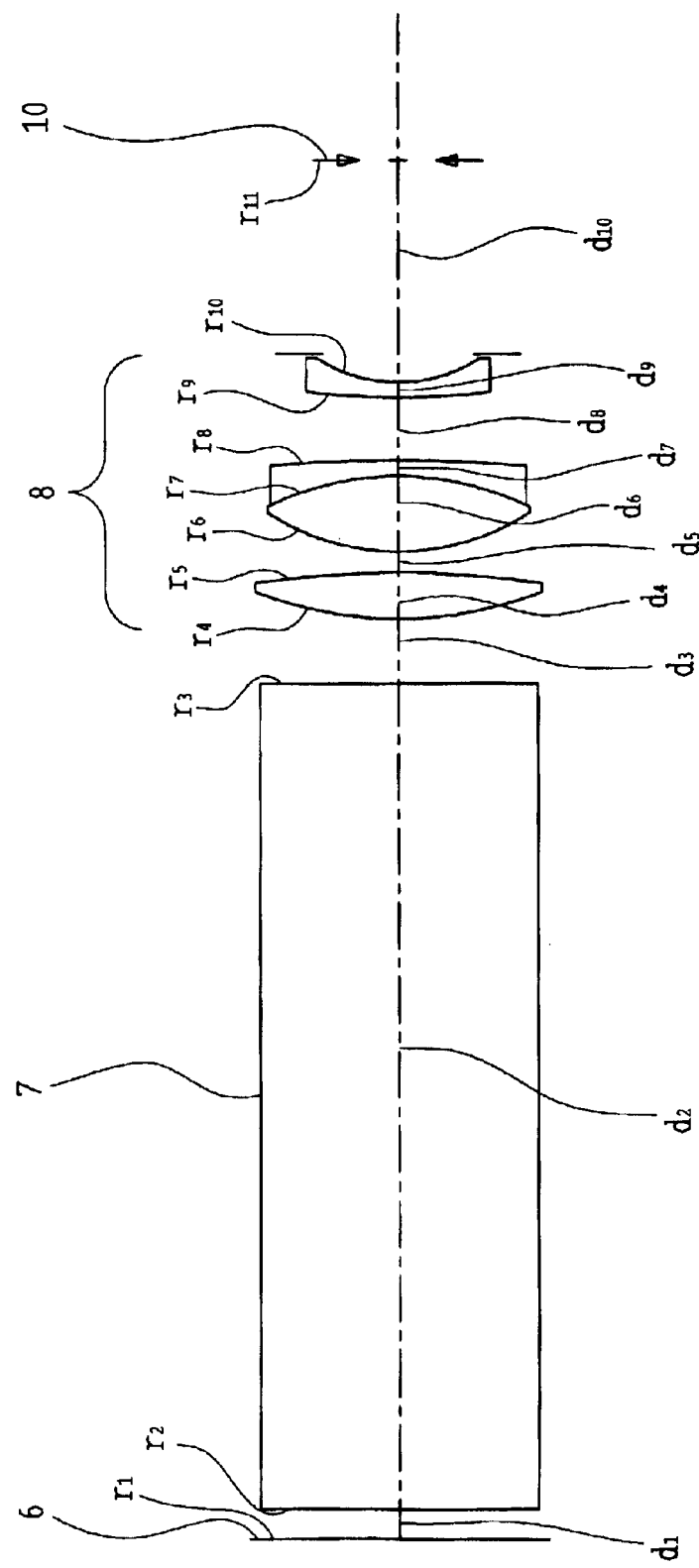
FIG. 12 is a sectional view showing an optical arrangement, developed along the optical axis, at a diopter of 0 $m^{-1}$, in a third embodiment of an eyepiece optical system used in the camera according to the present invention.
Figure 13:
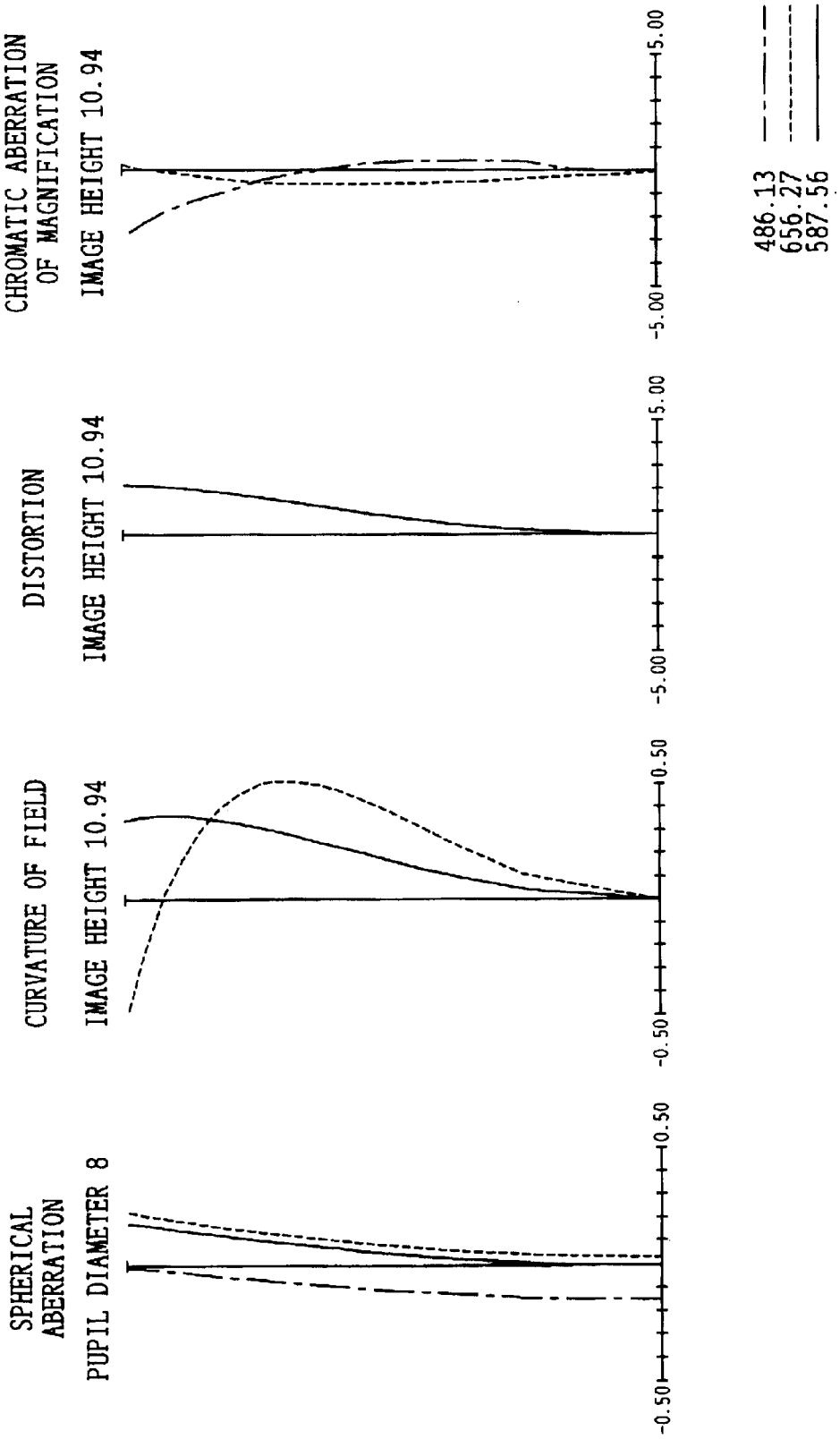
FIGS. 13A, 13B, 13C, and 13D are diagrams showing aberration characteristics at a diopter of +1 $m^{-1}$ in the third embodiment.
Figure 14:
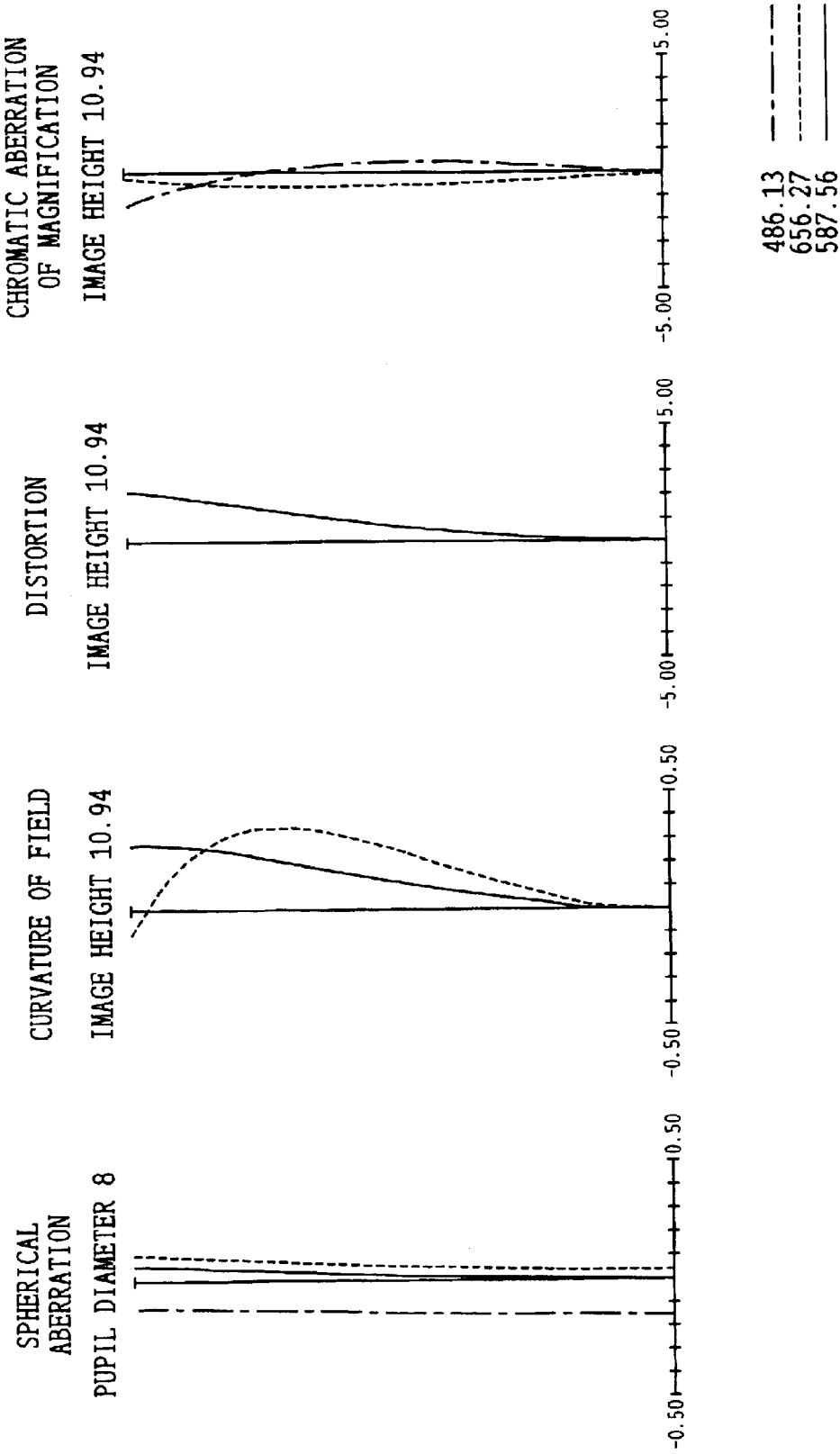
FIGS. 14A, 14B, 14C, and 14D are diagrams showing aberration characteristics at a diopter of 0 $m^{-1}$ in the third embodiment.
Figure 15:
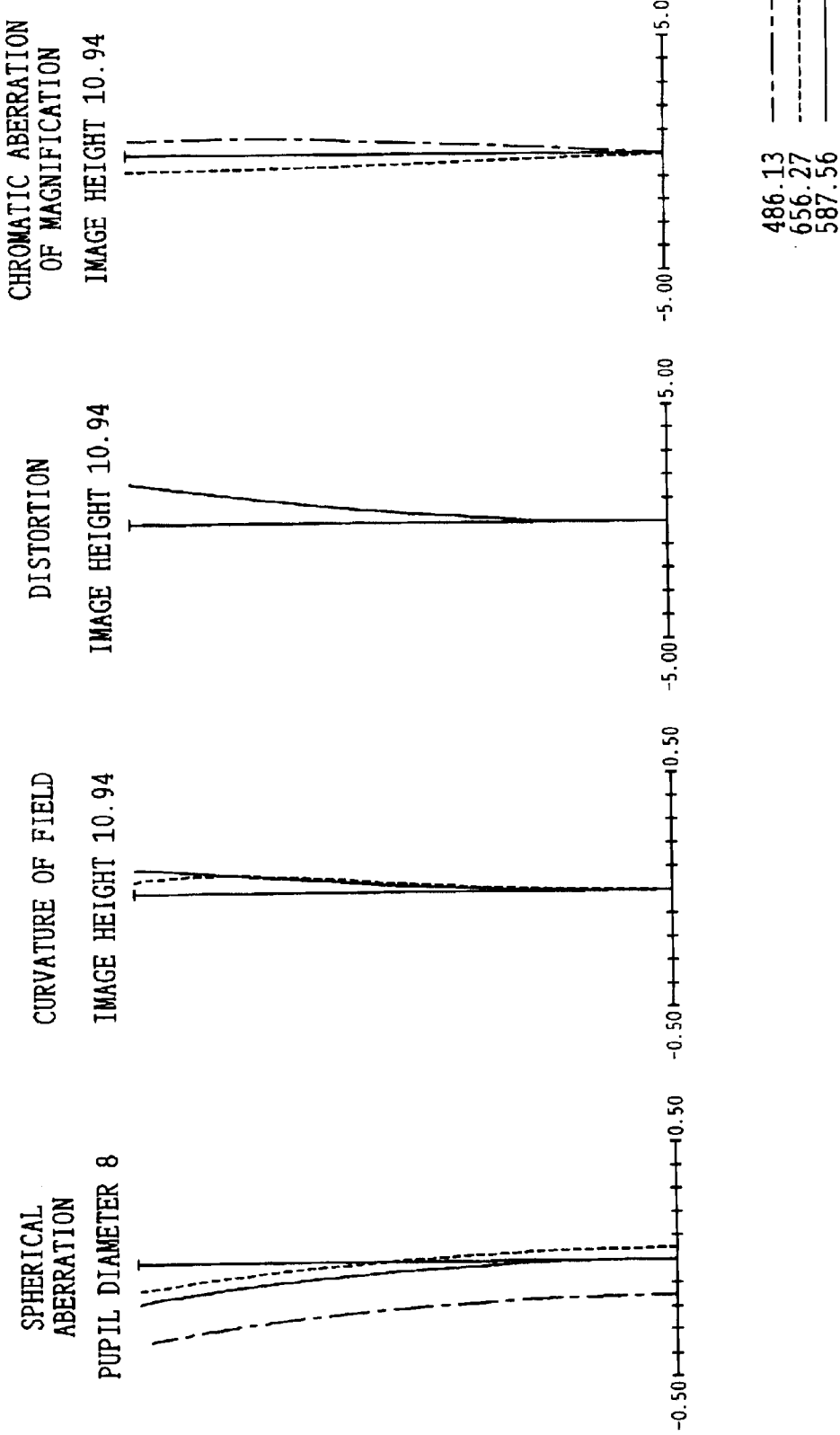
FIGS. 15A, 15B, 15C, and 15D are diagrams showing aberration characteristics at a diopter of −3 $m^{-1}$ in the third embodiment.

FIG. 12 shows an optical arrangement, at a diopter of 0 $m^{-1}$, in the third embodiment of the eyepiece system according to the present invention. For convenience of illustration, a plane-parallel plate-like member in FIG. 12 is shown by developing the pentagonal roof prism.

FIGS. 13A–13D, 14A–14D, and 15A–15D show aberration characteristics in the third embodiment. Also, the diopter $(m^{-1})$ is taken as the axis of abscissas relative to spherical aberration and curvature of field, and the angle (minute) is taken as the axis of abscissas relative to chromatic aberration of magnification.

The third embodiment has the pentagonal roof prism 7 and the eyepiece system 8. The eyepiece system 8 includes, in order from the object side, the first lens component 8a with positive refracting power which is a biconvex lens, the second lens component 8b with positive refracting power which is a cemented lens of a biconvex lens element $8b_1$ and a concave meniscus lens element $8b_2$, with a convex surface directed toward the object side, and the third lens component 8c with negative refracting power which is a concave meniscus lens. The diopter adjustment is made by moving the second lens component 8b.

Subsequently, numerical data of optical members constituting the eyepiece system of the third embodiment are shown below.

Numerical Data 3

Diopter $(m^{-1})$ = +1 ~ 0 ~ −3
fl (mm) = 47.18 ~ 50.00 ~ 63.63
Pupil diameter (mm) = 8
Diagonal length Y (or Y') (mm) = 22.2

| | | | |
|---|---|---|---|
| $r_1 = \infty$ | | | |
| | $d_1 = 3.00$ | | |
| $r_2 = \infty$ | | | |
| | $d_2 = 86.00$ | $n_{d2} = 1.51633$ | $\nu_{d2} = 64.14$ |
| $r_3 = \infty$ | | | |
| | $d_3 = 6.95$ | | |

-continued

| | | | |
|---|---|---|---|
| $r_4 = 48.639$ | | | |
| | $d_4 = 4.60$ | $n_{d4} = 1.51633$ | $\nu_{d4} = 64.14$ |
| $r_5 = -123.366$ | | | |
| | $d_5 = D5$ | | |
| $r_6 = 27.357$ | | | |
| | $d_6 = 7.90$ | $n_{d6} = 1.58913$ | $\nu_{d6} = 61.14$ |
| $r_7 = -32.073$ | | | |
| | $d_7 = 1.50$ | $n_{d7} = 1.80518$ | $\nu_{d7} = 25.42$ |
| $r_8 = -154.705$ | | | |
| | $d_8 = D8$ | | |
| $r_9 = 166.986$ | | | |
| | $d_9 = 1.50$ | $n_{d9} = 1.48749$ | $\nu_{d9} = 70.23$ |
| $r_{10} = 16.259$ | | | |
| | $d_{10} = 23.00$ | | |
| $r_{11} = $ Pupil | | | |

| Diopter (m$^{-1}$) = +1 ~ 0 ~ 3 | | | |
|---|---|---|---|
| D5 | 1.000 | 2.303 | 7.246 |
| D7 | 7.246 | 5.943 | 1.000 |

Numerical values of the conditions in the first to third embodiments are listed in

TABLE 1

| Conditions | 1st embodiment | 2nd embodiment | 3rd embodiment |
|---|---|---|---|
| (1) | 0.255 | 0.202 | 0.224 |
| (2) | 2.97 | 3.19 | 3.00 |
| (7) | -0.51 | -0.62 | -0.74 |
| (5) (mm) | 22.2 | 22.2 | 22.2 |

Also, the first to third embodiments are designed on the assumption that the exit pupil is formed at a distance of 23 mm from the last lens surface of the eyepiece.

Values of the factors of the conditions are as shown in Table 2.

TABLE 2

| | 1st embodiment | 2nd embodiment | 3rd embodiment |
|---|---|---|---|
| S | 12.7° | 11.4° | 12.6° |
| fb (f'b) | 65.94 mm | 70.82 mm | 66.6 mm |
| Y (Y') | 22.2 mm | 22.2 mm | 22.2 mm |
| f3 | 25.5 mm | 34.45 mm | 37.0 mm |
| f(f") | 50.00 mm | 55.57 mm | 50.00 mm |

Fourth Embodiment

Figure 16:
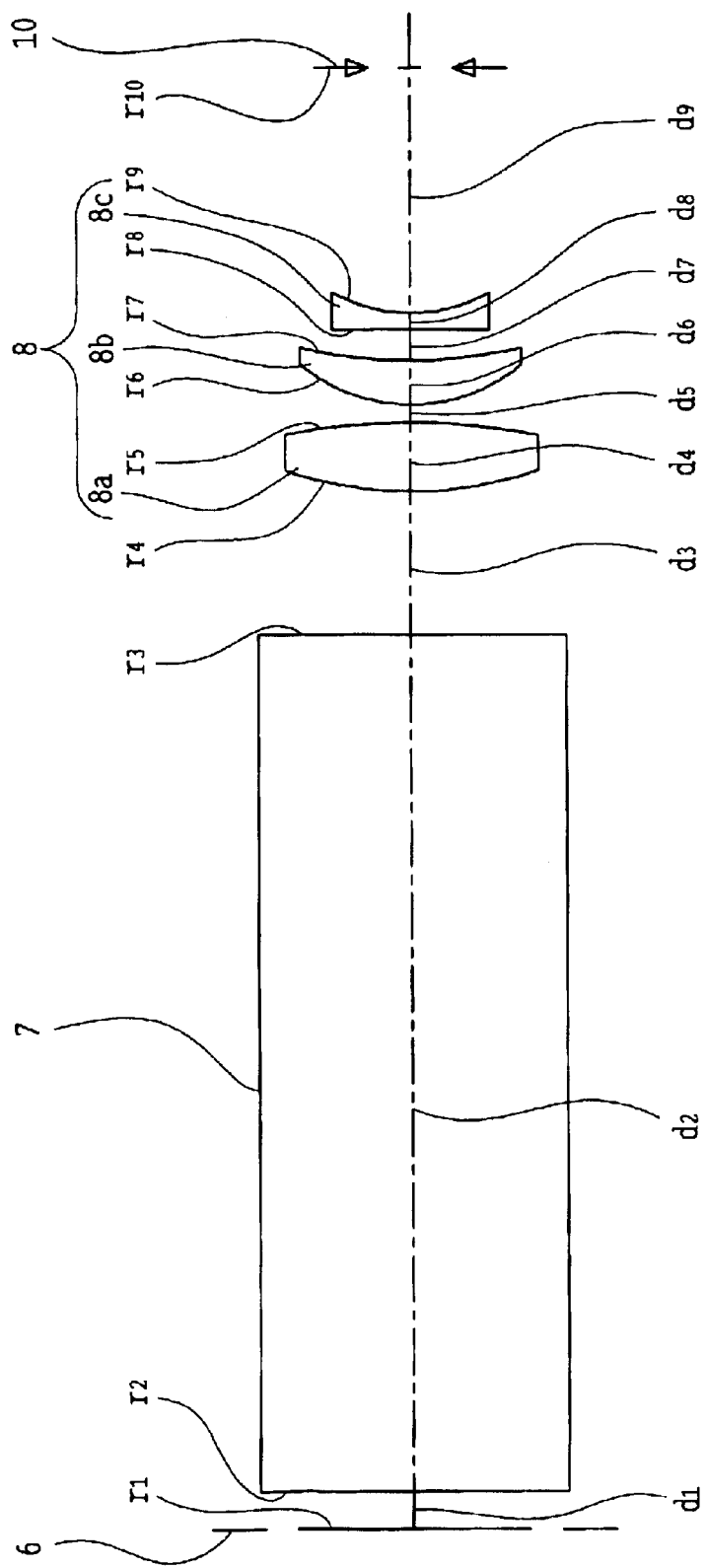
FIG. 16 is a sectional view showing an optical arrangement, developed along the optical axis, at a diopter of −0.5 $m^{-1}$, in a fourth embodiment of an eyepiece optical system used in the camera according to the present invention.
Figure 17:
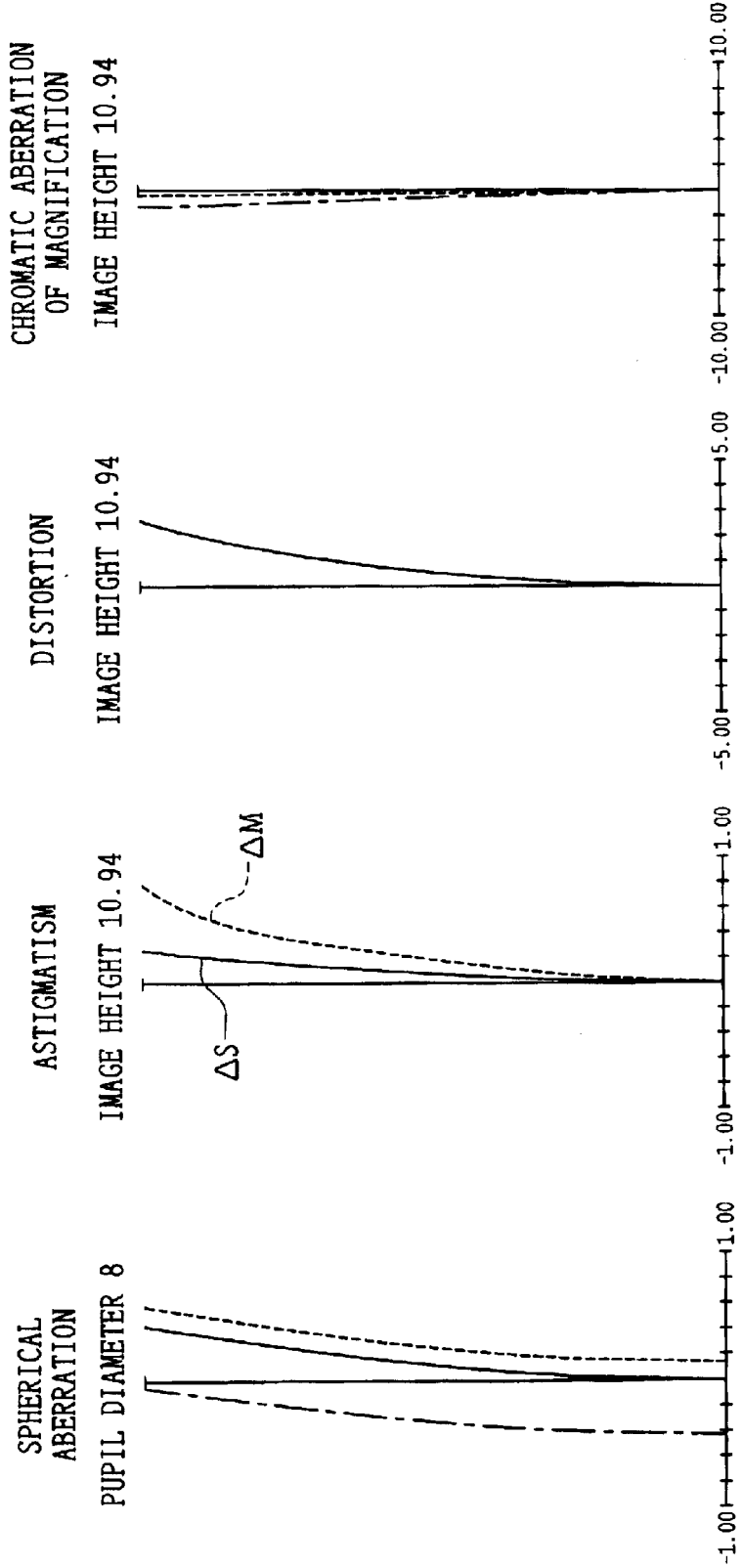
FIGS. 17A, 17B, 17C, and 17D are diagrams showing aberration characteristics at a diopter of +1 $m^{-1}$ in the fourth embodiment.
Figure 18:
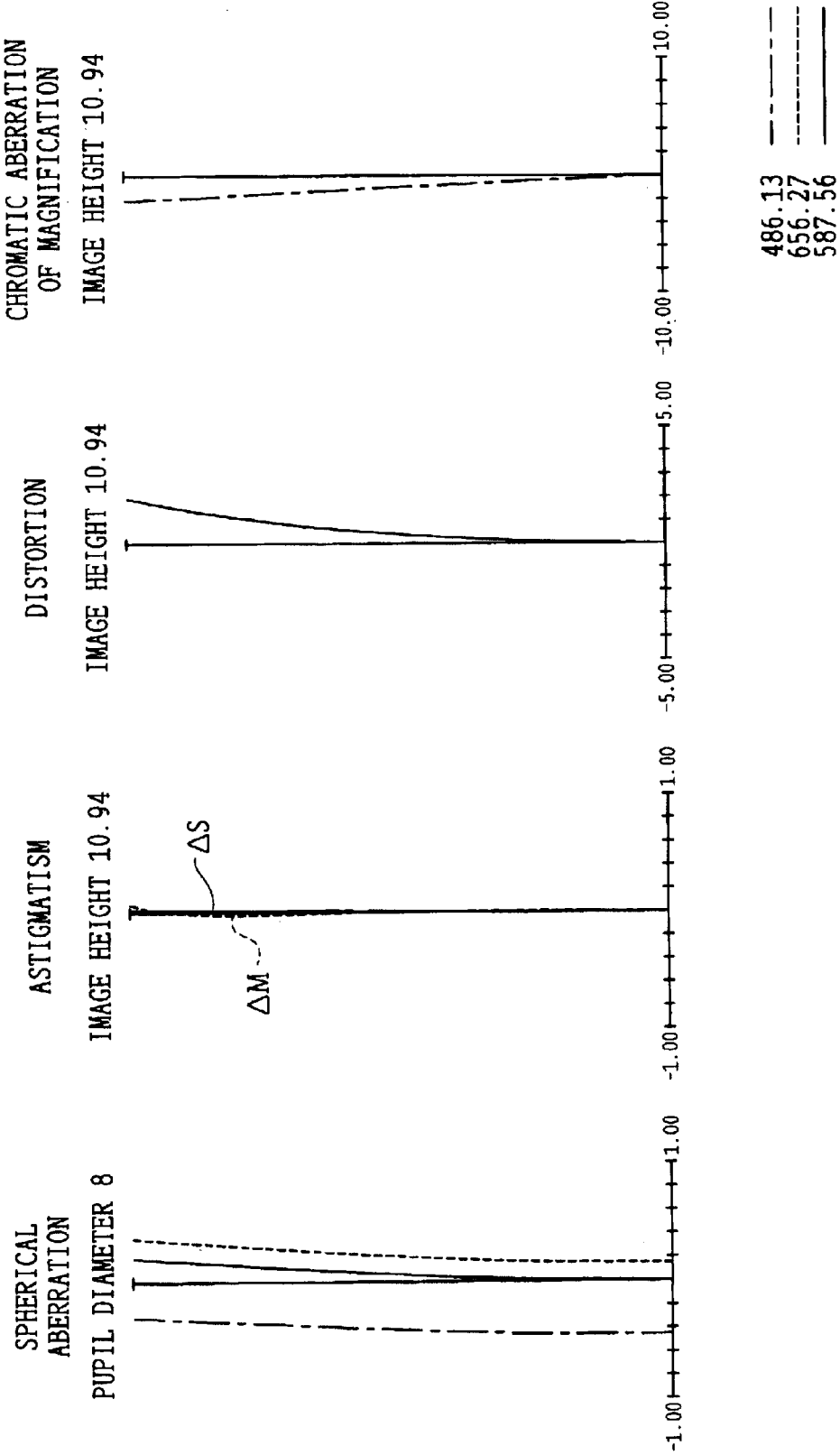
FIGS. 18A, 18B, 18C, and 18D are diagrams showing aberration characteristics at a diopter of −0.5 $m^{-1}$ in the fourth embodiment.
Figure 19:
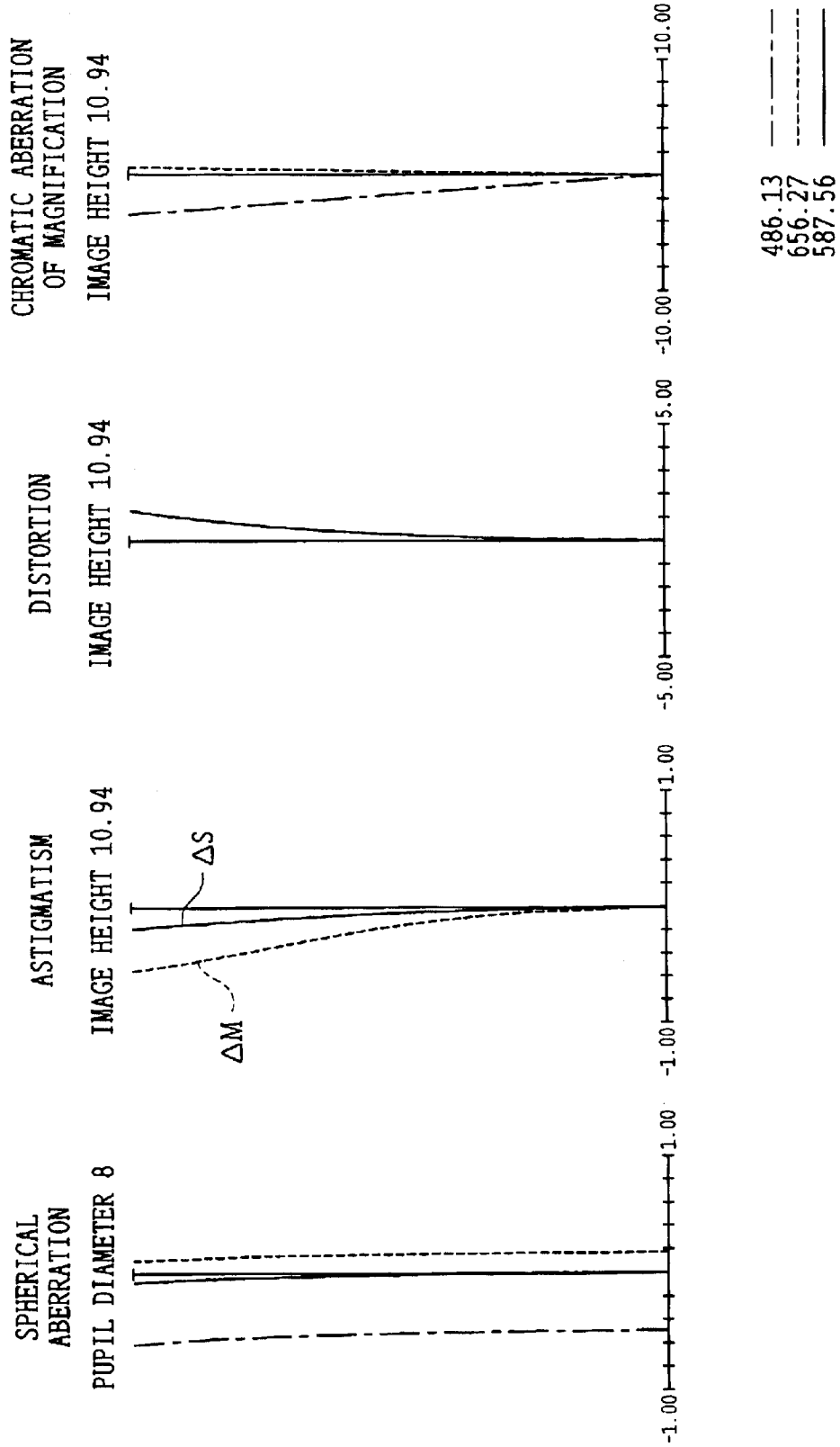
FIGS. 19A, 19B, 19C, and 19D are diagrams showing aberration characteristics at a diopter of −3 $m^{-1}$ in the fourth embodiment.

FIG. 16 shows an optical arrangement, at a diopter of -0.5 m$^{-1}$, in the fourth embodiment of the eyepiece system according to the present invention. For convenience of illustration, a plane-parallel plate-like member in FIG. 16 is shown by developing the pentagonal roof prism.

FIGS. 17A–17D, 18A–18D, and 19A–19D show aberration characteristics in the fourth embodiment. Also, the diopter (m$^{-1}$) is taken as the axis of abscissas relative to spherical aberration and curvature of field, and the angle (minute) is taken as the axis of abscissas relative to chromatic aberration of magnification.

The fourth embodiment has the pentagonal roof prism 7 and the eyepiece system 8. The eyepiece system 8 includes, in order from the object side, the first lens component 8a with positive refracting power which is a positive biconvex lens, the second lens component 8b with positive refracting power which is a single positive meniscus lens with a convex surface directed toward the object side, and the third lens component 8c with negative refracting power which is a negative biconcave lens. The diopter adjustment is made by moving the second lens component 8b.

Subsequently, numerical data of optical members constituting the eyepiece system of the fourth embodiment are shown below.

Numerical Data 4

| | | | |
|---|---|---|---|
| Diopter (m$^{-1}$) = +1 ~ -0.5 ~ -3 | | | |
| fl (mm) = 47.05 ~ 50.02 ~ 56.99 | | | |
| Pupil diameter (mm) = 8 | | | |
| Diagonal length Y (or Y') (mm) = 21.9 | | | |
| fb' = 1.4 f' | | | |

| | | | |
|---|---|---|---|
| $r_1 = \infty$ | | | |
| | $d_1 = 3.50$ | | |
| $r_2 = \infty$ | | | |
| | $d_2 = 80.38$ | $n_{d2} = 1.51633$ | $\nu_{d2} = 64.14$ |
| $r_3 = \infty$ | | | |
| | $d_3 = 13.63$ | | |
| $r_4 = 36.997$ | | | |
| | $d_4 = 6.45$ | $n_{d4} = 1.60311$ | $\nu_{d4} = 60.64$ |
| $r_5 = -60.534$ | | | |
| | $d_5 = D5$ | | |
| $r_6 = 15.951$ | | | |
| | $d_6 = 4.02$ | $n_{d6} = 1.60311$ | $\nu_{d6} = 60.64$ |
| $r_7 = 47.972$ | | | |
| | $d_7 = D7$ | | |
| $r_8 = -448.012$ | | | |
| | $d_8 = 1.50$ | $n_{d8} = 1.80518$ | $\nu_{d8} = 25.42$ |
| $r_9 = 15.260$ | | | |
| | $d_9 = 23.00$ | | |
| $r_{10} = $ Pupil | | | |

| Diopter (m$^{-1}$) = +1 ~ -0.5 ~ -3 | | | |
|---|---|---|---|
| D5 | 1.07 | 1.61 | 2.70 |
| D7 | 3.46 | 2.92 | 1.83 |

Fifth Embodiment

Figure 20:
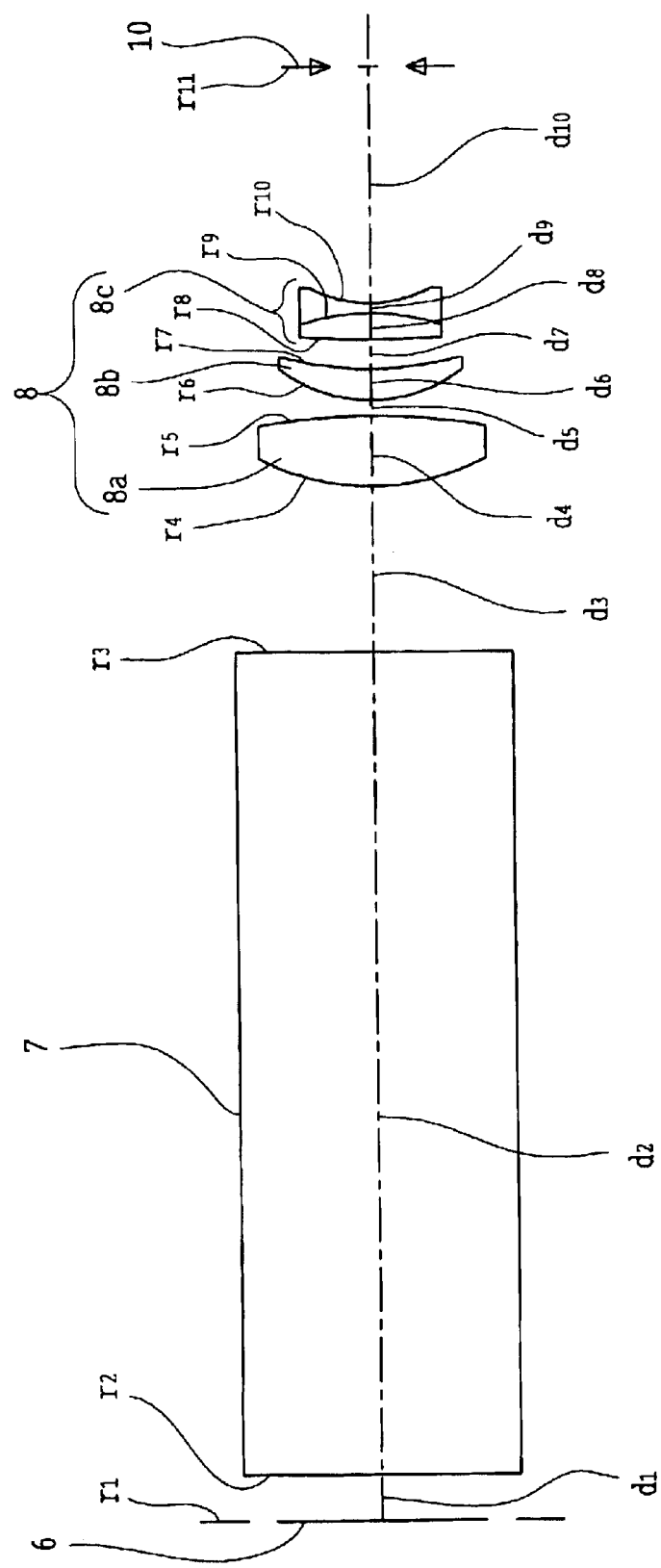
FIG. 20 is a sectional view showing an optical arrangement, developed along the optical axis, at a diopter of −0.5 $m^{-1}$, in a fifth embodiment of an eyepiece optical system used in the camera according to the present invention.
Figure 21:
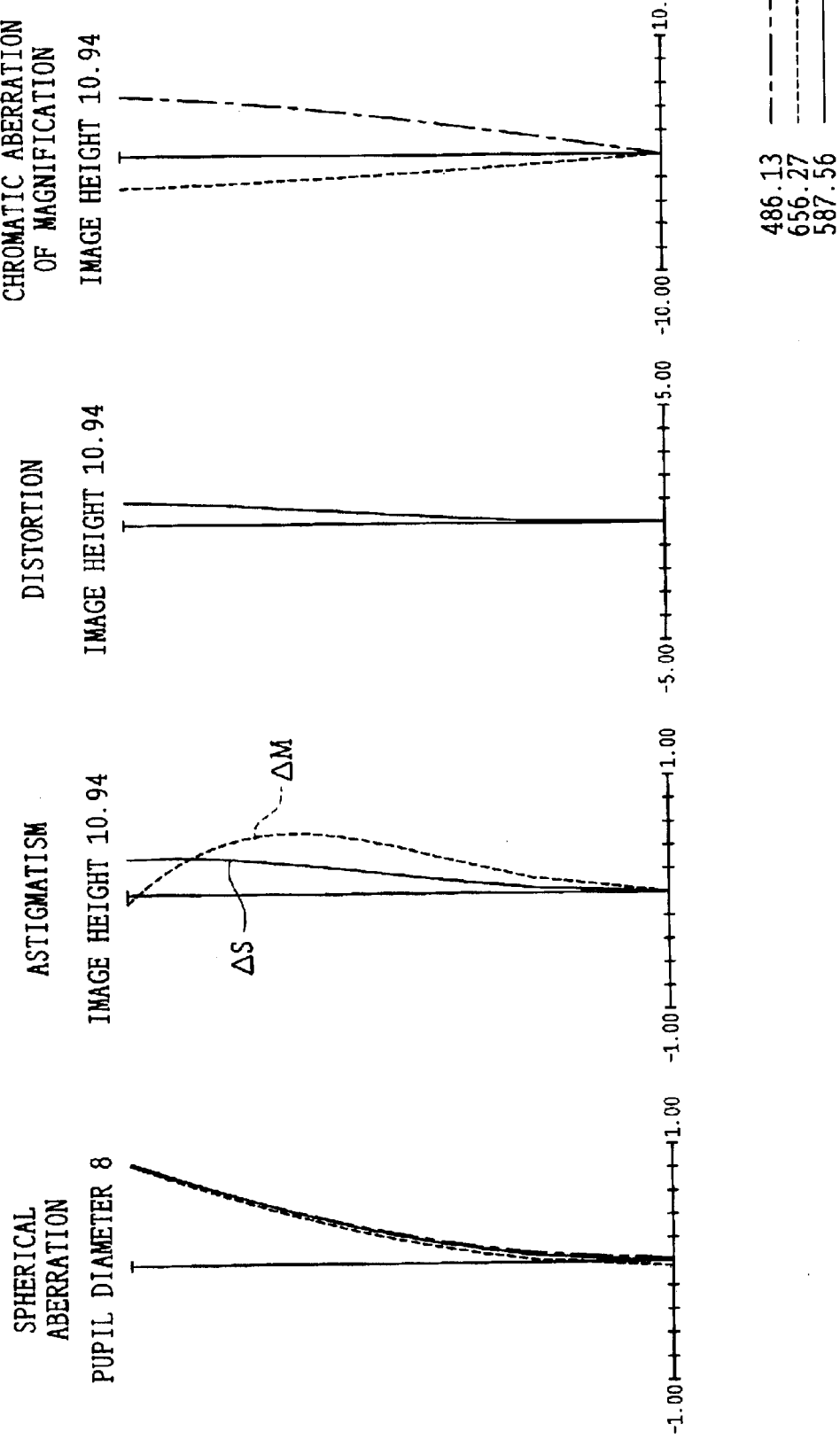
FIGS. 21A, 21B, 21C, and 21D are diagrams showing aberration characteristics at a diopter of +1 $m^{-1}$ in the fifth embodiment.
Figure 22:
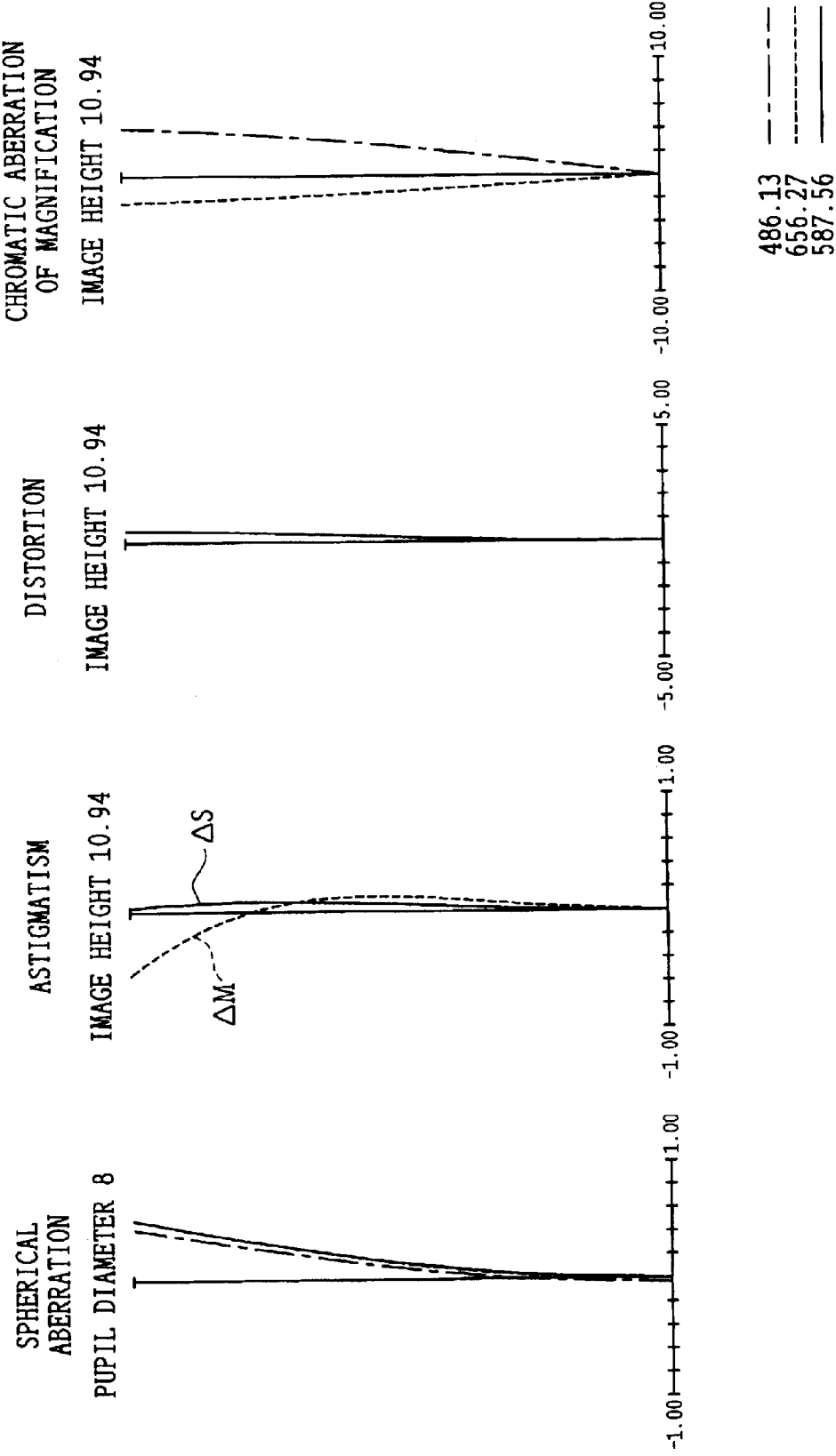
FIGS. 22A, 22B, 22C, and 22D are diagrams showing aberration characteristics at a diopter of −0.5 $m^{-1}$ in the fifth embodiment.
Figure 23:
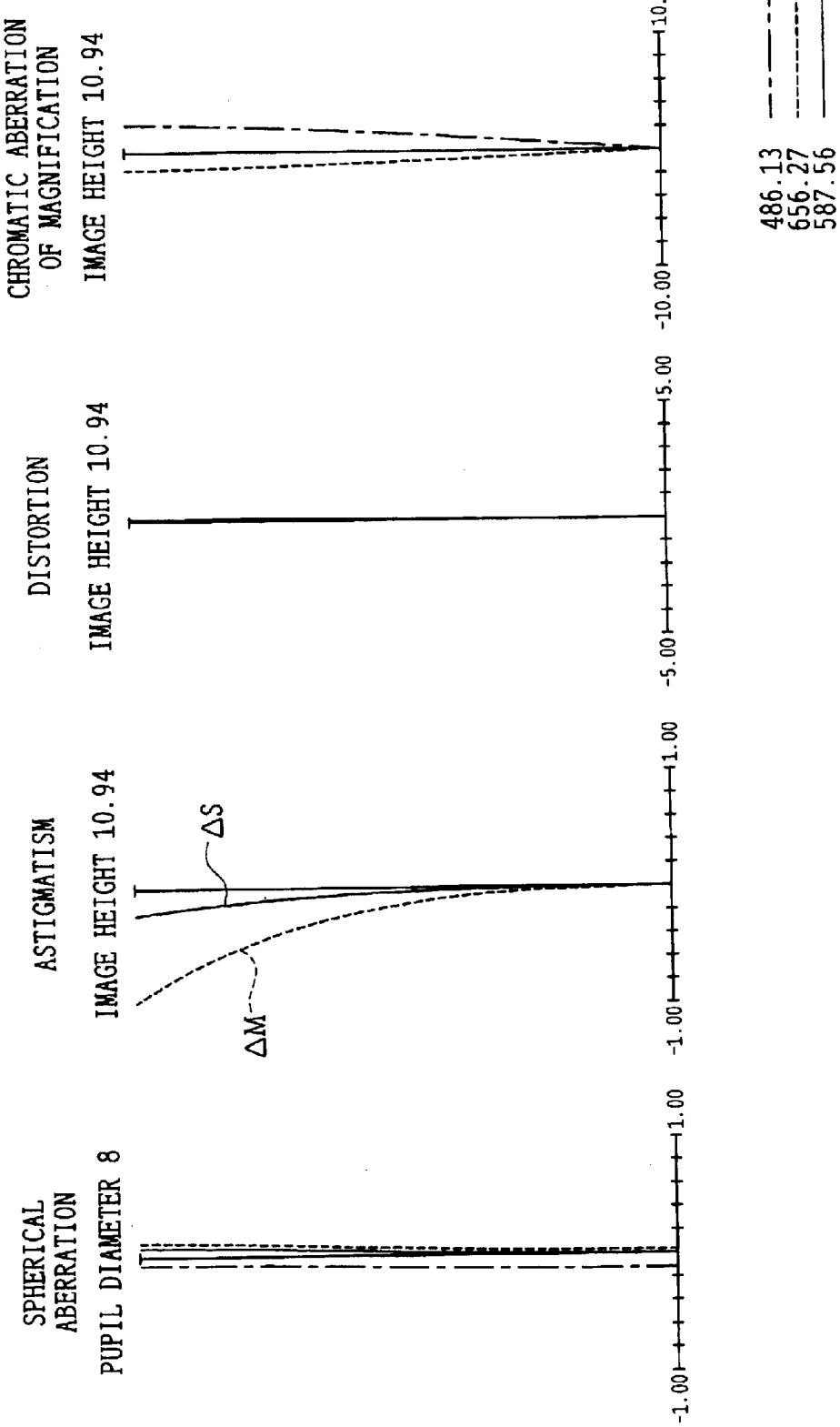
FIGS. 23A, 23B, 23C, and 23D are diagrams showing aberration characteristics at a diopter of −3 $m^{-1}$ in the fifth embodiment.

FIG. 20 shows an optical arrangement, at a diopter of -0.5 m$^{-1}$, in the fifth embodiment of the eyepiece system according to the present invention. For convenience of illustration, a plane-parallel plate-like member in FIG. 20 is shown by developing the pentagonal roof prism.

FIGS. 21A–21D, 22A–22D, and 23A–23D show aberration characteristics in the fifth embodiment. Also, the diopter (m$^{-1}$) is taken as the axis of abscissas relative to spherical aberration and curvature of field, and the angle (minute) is taken as the axis of abscissas relative to chromatic aberration of magnification.

The fifth embodiment has the pentagonal roof prism 7 and the eyepiece system 8. The eyepiece system 8 includes, in order from the object side, the first lens component 8a with positive refracting power which is a positive biconvex lens, the second lens component 8b with positive refracting power which is a single positive meniscus lens with a convex surface directed toward the object side, and a third lens component 8c' which is a cemented lens of a positive biconvex lens element and a negative biconcave lens element, having negative refracting power as a whole. The diopter adjustment is made by moving the second lens component 8b.

Subsequently, numerical data of optical members constituting the eyepiece system of the fifth embodiment are shown below.

Numerical Data 5

Diopter (m$^{-1}$) = +1 ~ -0.5 ~ -3
fl (mm) = 47.84 ~ 50.80 ~ 57.76
Pupil diameter (mm) = 8

Diagonal length Y (or Y') (mm) = 21.9
fb' = 1.4 f'

| | | | |
|---|---|---|---|
| $r_1 = \infty$ | | | |
| | $d_1 = 4.50$ | | |
| $r_2 = \infty$ | | | |
| | $d_2 = 80.38$ | $n_{d2} = 1.51633$ | $\nu_{d2} = 64.14$ |
| $r_3 = \infty$ | | | |
| | $d_3 = 16.14$ | | |
| $r_4 = 27.127$ | | | |
| | $d_4 = 6.89$ | $n_{d4} = 1.48749$ | $\nu_{d4} = 70.23$ |
| $r_5 = -73.436$ | | | |
| | $d_5 = D5$ | | |
| $r_6 = 16.252$ | | | |
| | $d_6 = 3.13$ | $n_{d6} = 1.69680$ | $\nu_{d6} = 55.53$ |
| $r_7 = 37.375$ | | | |
| | $d_7 = D7$ | | |
| $r_8 = 118.048$ | | | |
| | $d_8 = 2.57$ | $n_{d8} = 1.69680$ | $\nu_{d8} = 55.53$ |
| $r_9 = -24.798$ | | | |
| | $d_9 = 1.00$ | $n_{d9} = 1.80610$ | $\nu_{d9} = 40.92$ |
| $r_{10} = 14.528$ | | | |
| | $d_{10} = 23.00$ | | |
| $r_{11}$ = Pupil | | | |

| Diopter (m$^{-1}$) = +1 | −0.5 | −3 |
|---|---|---|
| D5  1.00 | 1.56 | 2.69 |
| D7  3.44 | 2.88 | 1.75 |

Sixth Embodiment

Figure 24:
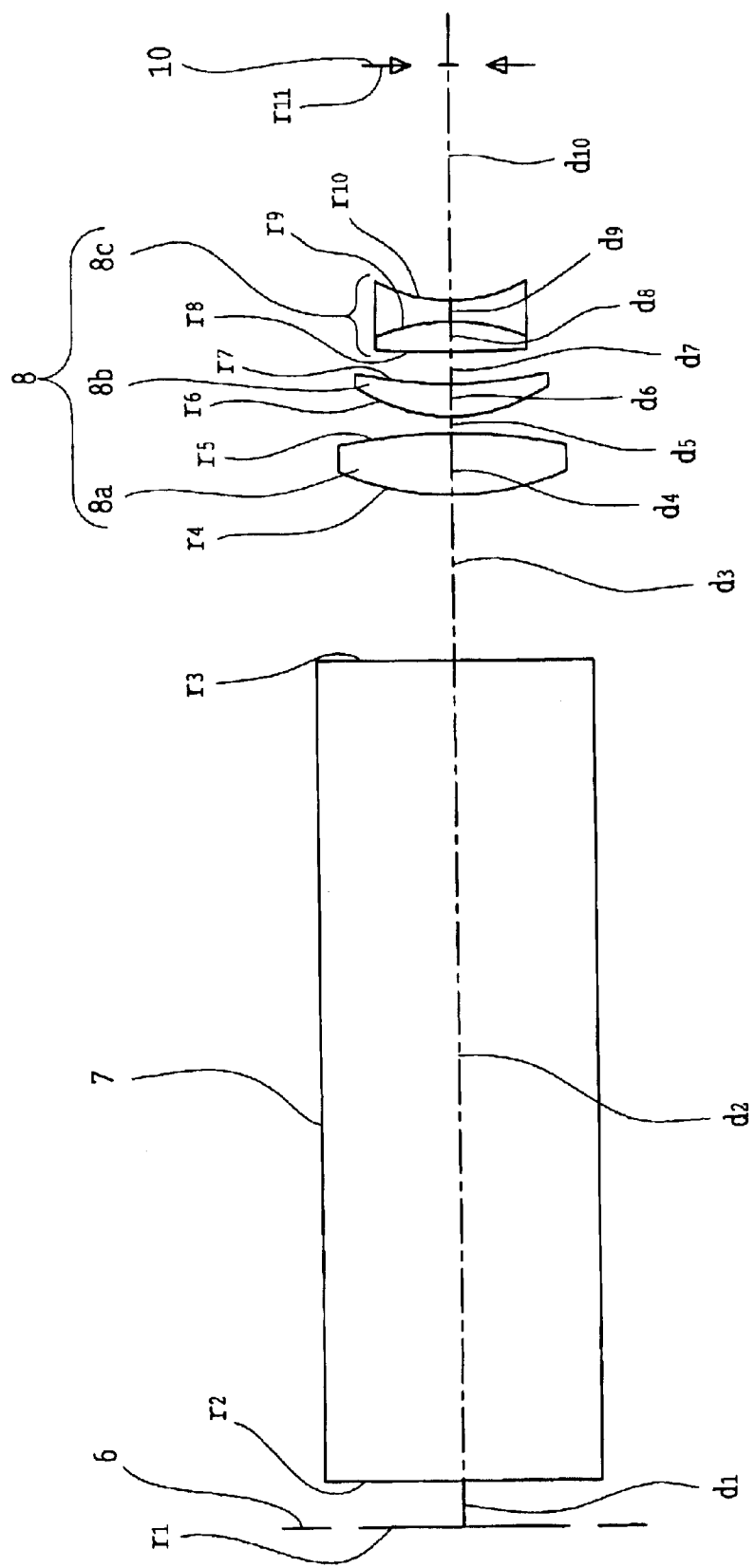
FIG. 24 is a sectional view showing an optical arrangement, developed along the optical axis, at a diopter of −0.5 $m^{-1}$, in a sixth embodiment of an eyepiece optical system used in the camera according to the present invention.
Figure 25:
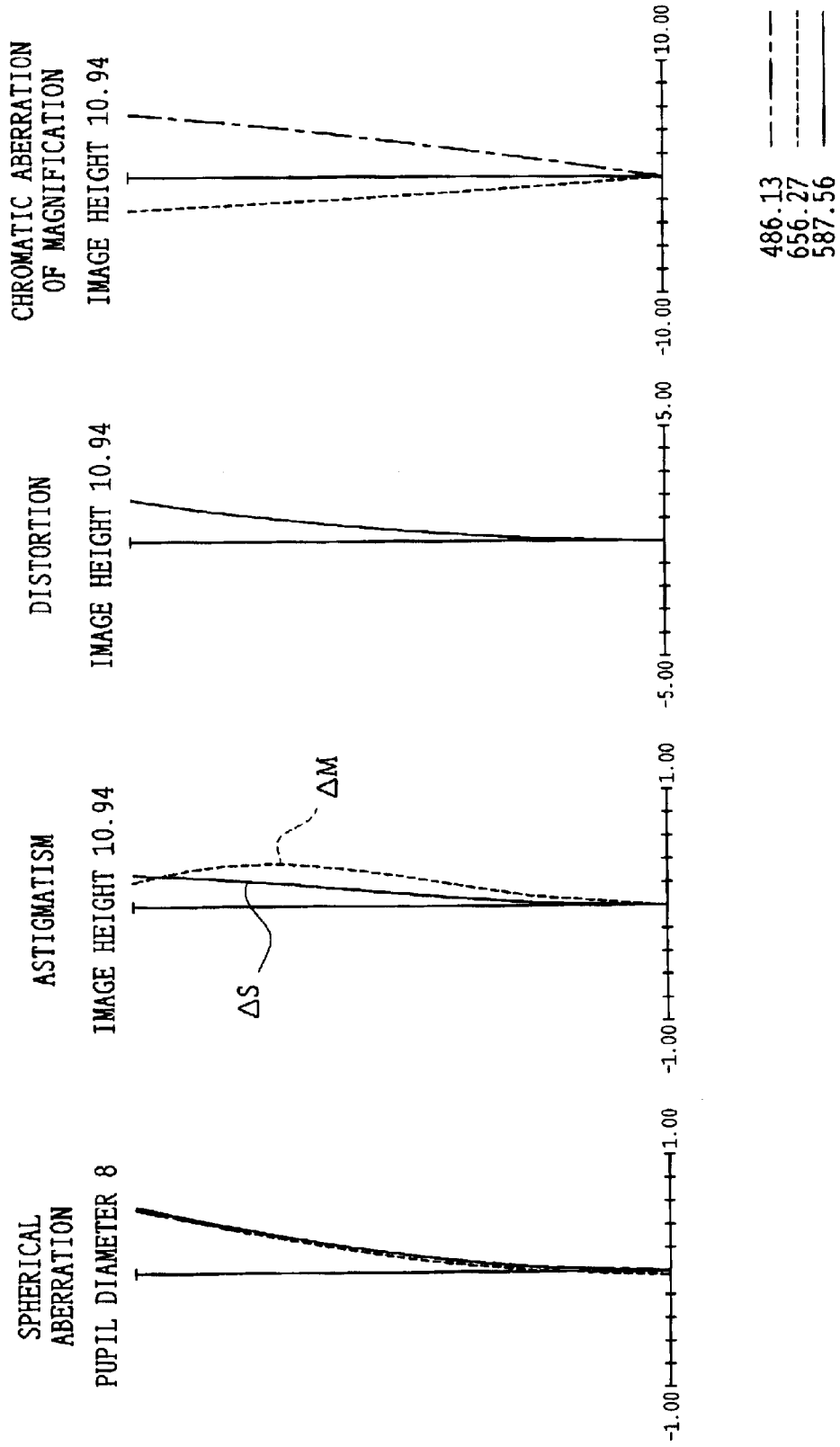
FIGS. 25A, 25B, 25C, and 25D are diagrams showing aberration characteristics at a diopter of +1 $m^{-1}$ in the sixth embodiment.
Figure 26:
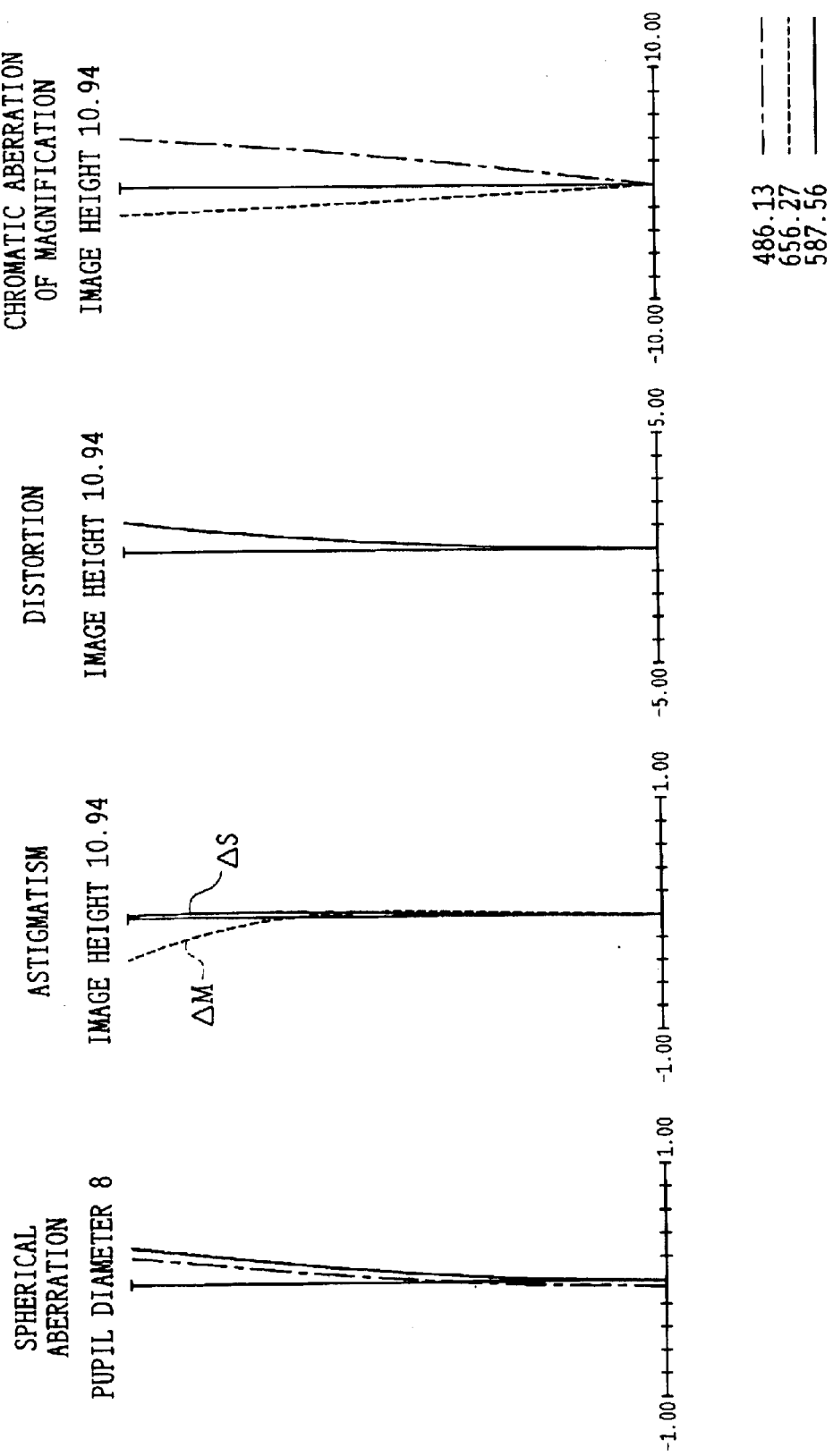
FIGS. 26A, 26B, 26C, and 26D are diagrams showing aberration characteristics at a diopter of $-0.5$ m$^{-1}$ in the sixth embodiment.
Figure 27:
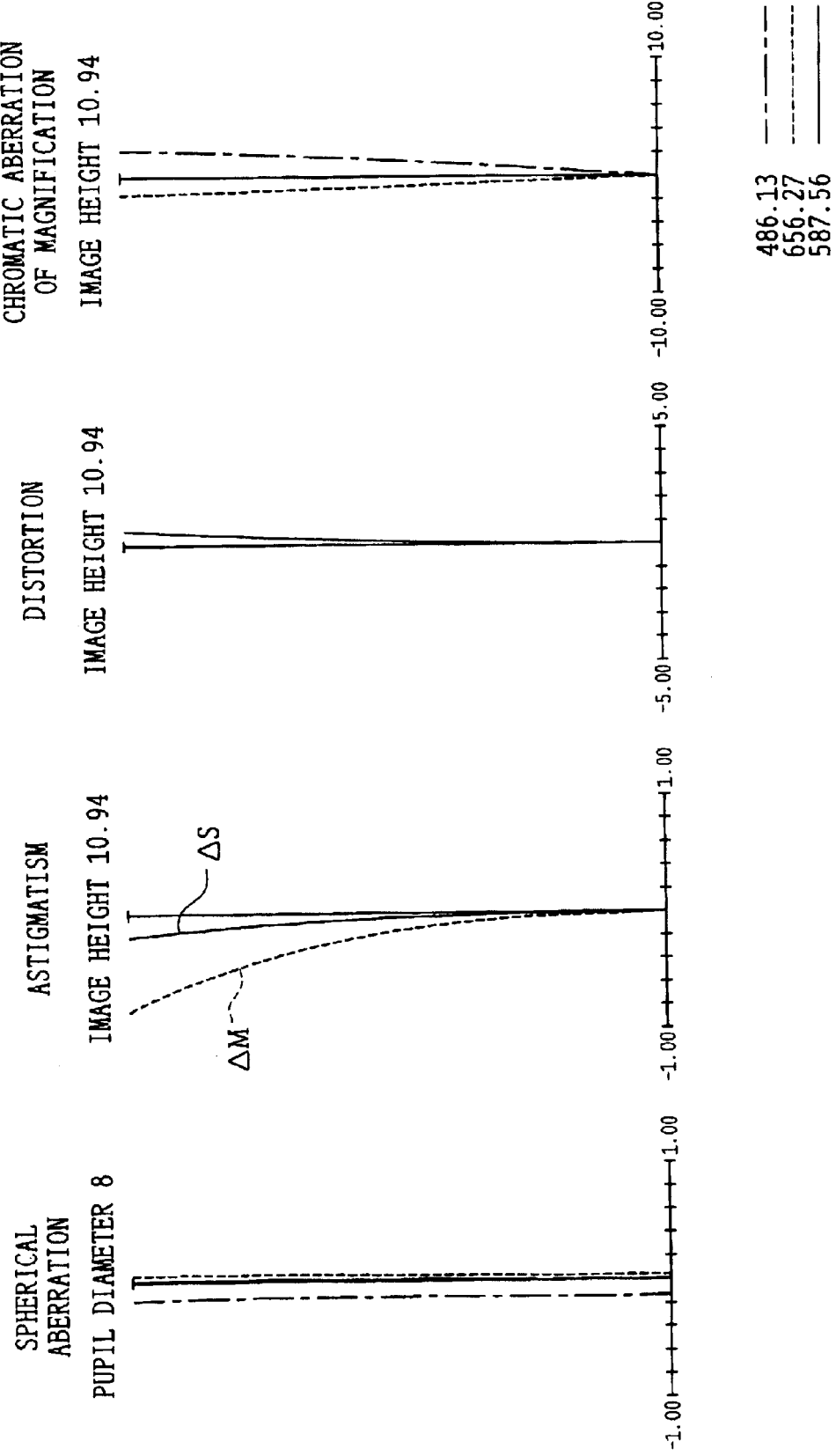
FIGS. 27A, 27B, 27C, and 27D are diagrams showing aberration characteristics at a diopter of $-3$ m$^{-1}$ in the sixth embodiment.

FIG. 24 shows an optical arrangement, at a diopter of −0.5 m$^{-1}$, in the sixth embodiment of the eyepiece system according to the present invention. For convenience of illustration, a plane-parallel plate-like member in FIG. 24 is shown by developing the pentagonal roof prism.

FIGS. 25A–25D, 26A–26D, and 27A–27D show aberration characteristics in the sixth embodiment. Also, the diopter (m$^{-1}$) is taken as the axis of abscissas relative to spherical aberration and curvature of field, and the angle (minute) is taken as the axis of abscissas relative to chromatic aberration of magnification.

The sixth embodiment has the pentagonal roof prism 7 and the eyepiece system 8. The eyepiece system 8 includes, in order from the object side, the first lens component 8a with positive refracting power which is a positive biconvex lens, the second lens component 8b with positive refracting power which is a single positive meniscus lens with a convex surface directed toward the object side, and the third lens component 8c' which is a cemented lens of a positive biconvex lens element and a negative biconcave lens element, having negative refracting power as a whole. The diopter adjustment is made by moving the second lens component 8b.

Subsequently, numerical data of optical members constituting the eyepiece system of the sixth embodiment are shown below.

Numerical Data 6

Diopter (m$^{-1}$) = +1 ~ −0.5 ~ −3
fl (mm) = 47.80 ~ 50.81 ~ 57.97
Pupil diameter (mm) = 8
Diagonal length Y (or Y') (mm) = 21.9
fb' = 1.4 f'

| | | | |
|---|---|---|---|
| $r_1 = \infty$ | | | |
| | $d_1 = 4.50$ | | |
| $r_2 = \infty$ | | | |
| | $d_2 = 80.38$ | $n_{d2} = 1.51633$ | $\nu_{d2} = 64.14$ |
| $r_3 = \infty$ | | | |
| | $d_3 = 16.14$ | | |
| $r_4 = 30.040$ | | | |
| | $d_4 = 6.09$ | $n_{d4} = 1.48749$ | $\nu_{d4} = 70.23$ |
| $r_5 = -61.367$ | | | |
| | $d_5 = D5$ | | |
| $r_6 = 18.892$ | | | |
| | $d_6 = 3.20$ | $n_{d6} = 1.69680$ | $\nu_{d6} = 55.53$ |
| $r_7 = 45.924$ | | | |
| | $d_7 = D7$ | | |
| $r_8 = 187.857$ | | | |
| | $d_8 = 3.00$ | $n_{d8} = 1.69680$ | $\nu_{d8} = 55.53$ |
| $r_9 = -22.241$ | | | |
| | $d_9 = 2.04$ | $n_{d9} = 1.80610$ | $\nu_{d9} = 40.92$ |
| $r_{10} = 16.819$ | | | |
| | $d_{10} = 23.00$ | | |
| $r_{11}$ = Pupil | | | |

| Diopter (m$^{-1}$) = +1 | −0.5 | −3 |
|---|---|---|
| D5  1.00 | 1.69 | 3.06 |
| D7  3.82 | 3.13 | 1.76 |

Seventh Embodiment

Figure 28:
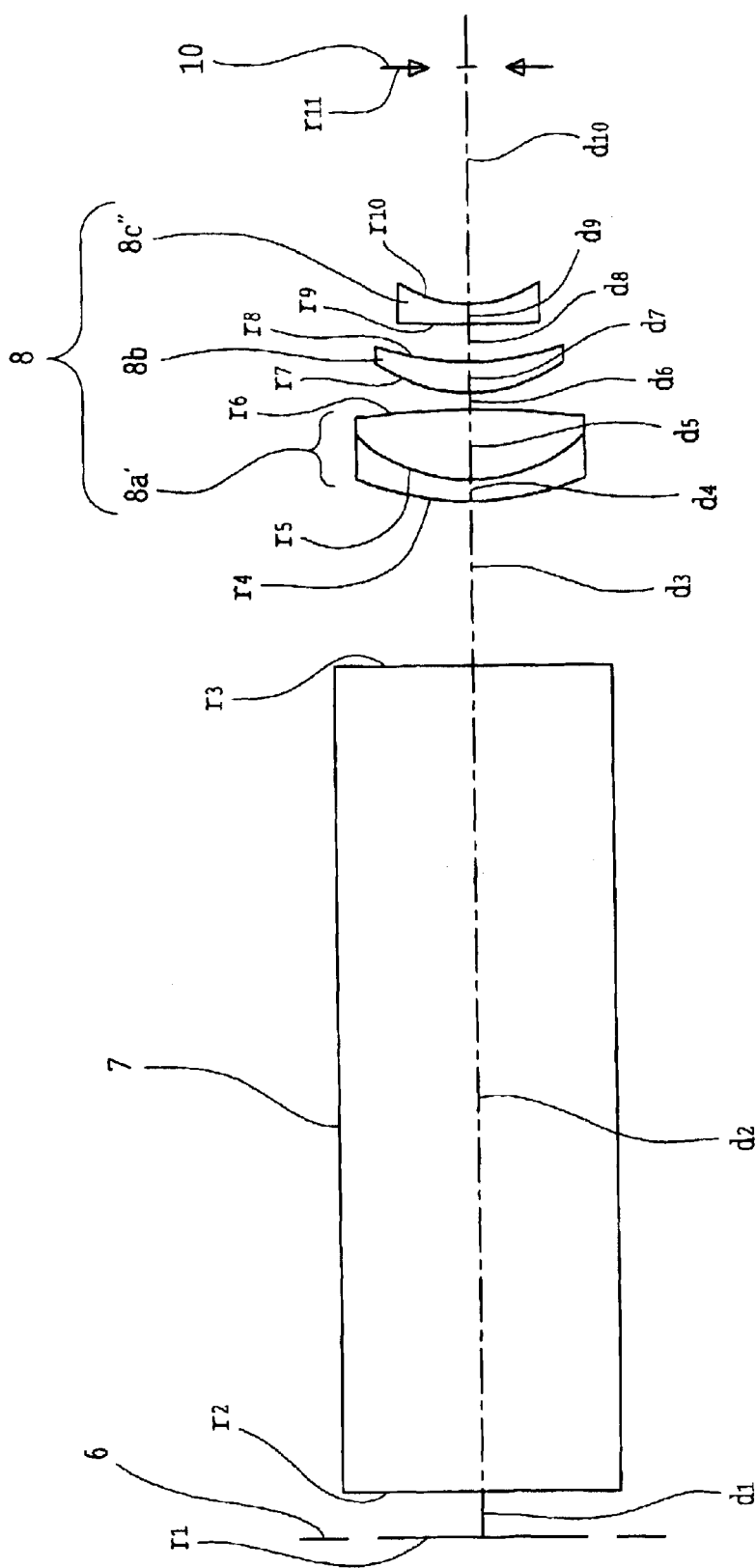
FIG. 28 is a sectional view showing an optical arrangement, developed along the optical axis, at a diopter of $-0.5$ m$^{-1}$, in a seventh embodiment of an eyepiece optical system used in the camera according to the present invention.
Figures 31A, 31B, 31C, 31D:
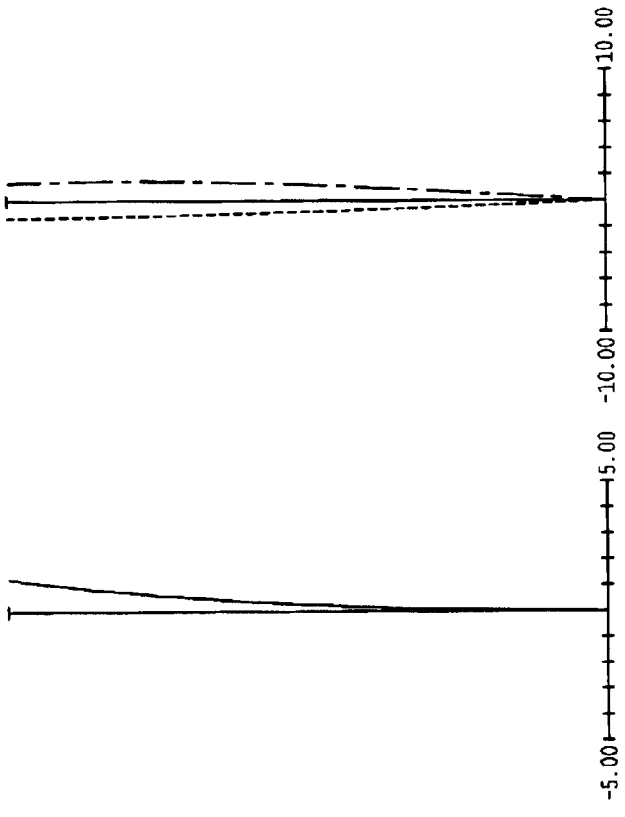
FIGS. 31A, 31B, 31C, and 31D are diagrams showing aberration characteristics at a diopter of $-3$ m$^{-1}$ in the seventh embodiment.

FIG. 28 shows an optical arrangement, at a diopter of −0.5 m$^{-1}$, in the seventh embodiment of the eyepiece system according to the present invention. For convenience of illustration, a plane-parallel plate-like member in FIG. 28 is shown by developing the pentagonal roof prism.

FIGS. 29A–29D, 30A–30D, and 31A–31D show aberration characteristics in the seventh embodiment. Also, the diopter (m$^{-1}$) is taken as the axis of abscissas relative to spherical aberration and curvature of field, and the angle (minute) is taken as the axis of abscissas relative to chromatic aberration of magnification.

The seventh embodiment has the pentagonal roof prism 7 and the eyepiece system 8. The eyepiece system 8 includes, in order from the object side, a first lens component 8a' in which a negative meniscus lens with a convex surface directed toward the object side is cemented to a positive biconvex lens, having positive refracting power as a whole, the second lens component 8b with positive refracting power which is a single positive meniscus lens with a convex surface directed toward the object side, and a third lens component 8c'' with negative refracting power which is a negative meniscus lens with a convex surface directed toward the object side. The diopter adjustment is made by moving the second lens component 8b.

Subsequently, numerical data of optical members constituting the eyepiece system of the seventh embodiment are shown below.

Numerical Data 7

Diopter (m$^{-1}$) = +1 ~ −0.5 ~ −3
fl (mm) = 47.86 ~ 50.80 ~ 57.70
Pupil diameter (mm) = 8
Diagonal length Y (or Y') (mm) = 21.9
fb' = 1.4 f'

| | | | |
|---|---|---|---|
| $r_1 = \infty$ | | | |
| | $d_1 = 4.50$ | | |
| $r_2 = \infty$ | | | |
| | $d_2 = 80.38$ | $n_{d2} = 1.51633$ | $\nu_{d2} = 64.14$ |
| $r_3 = \infty$ | | | |
| | $d_3 = 16.14$ | | |
| $r_4 = 34.412$ | | | |
| | $d_4 = 2.00$ | $n_{d4} = 1.72825$ | $\nu_{d4} = 28.46$ |

-continued

| | | | |
|---|---|---|---|
| $r_5 = 18.219$ | | | |
| | $d_5 = 6.90$ | $n_{d5} = 1.69680$ | $\upsilon_{d5} = 55.53$ |
| $r_6 = -93.287$ | | | |
| | $d_6 = D6$ | | |
| $r_7 = 17.624$ | | | |
| | $d_7 = 3.05$ | $n_{d5} = 1.80610$ | $\upsilon_{d5} = 40.92$ |
| $r_8 = 32.403$ | | | |
| | $d_8 = D8$ | | |
| $r_9 = 229.785$ | | | |
| | $d_9 = 2.00$ | $n_{d9} = 1.80610$ | $\upsilon_{d9} = 40.92$ |
| $r_{10} = 14.411$ | | | |
| | $d_{10} = 23.00$ | | |
| $r_{11} = $ Pupil | | | |

| Diopter $(m^{-1})$ = | +1 ~ | -0.5 ~ | -3 |
|---|---|---|---|
| D5 | 1.00 | 1.62 | 2.87 |
| D7 | 4.27 | 3.65 | 2.40 |

Eighth Embodiment

Figure 32:
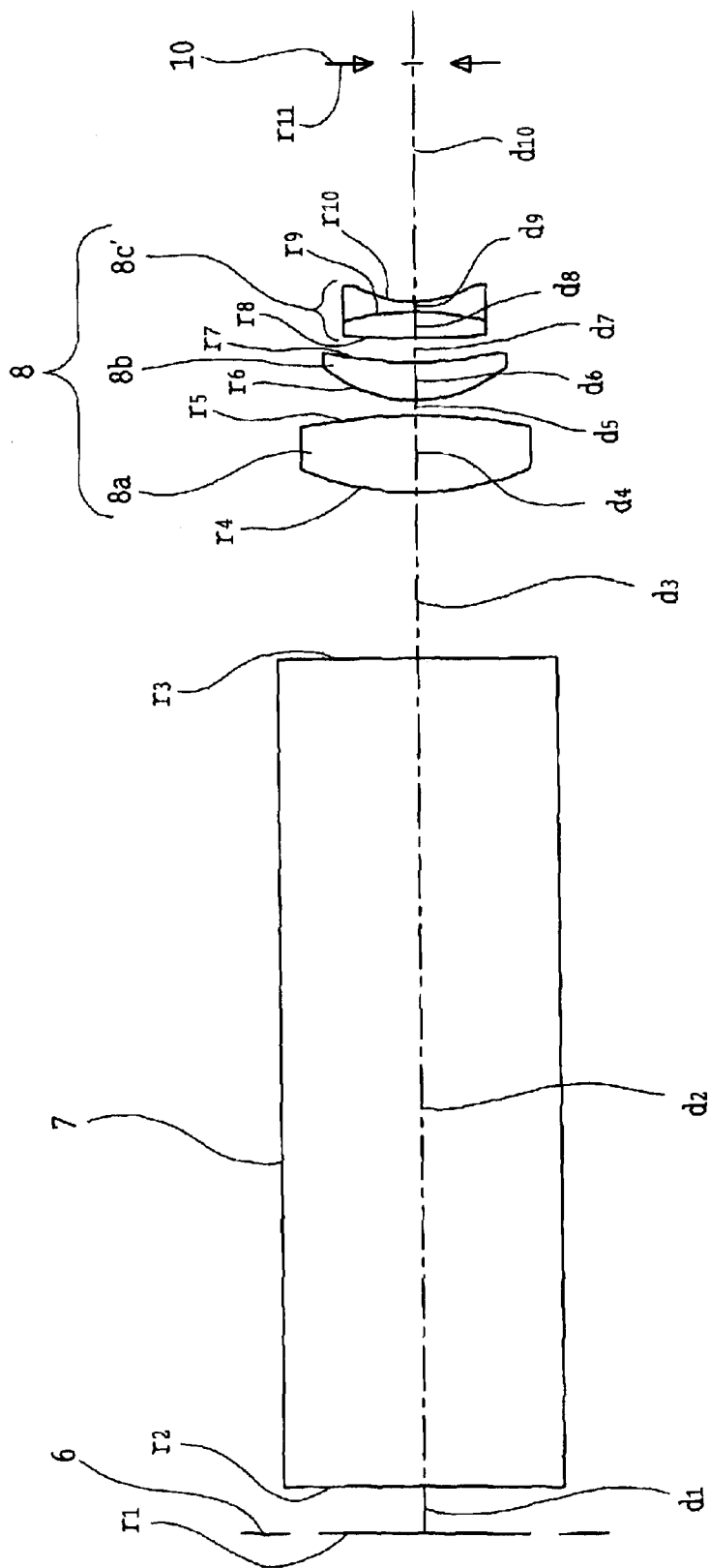
FIG. 32 is a sectional view showing an optical arrangement, developed along the optical axis, at a diopter of $-0.5$ m$^{-1}$, in an eighth embodiment of an eyepiece optical system used in the camera according to the present invention.

FIG. 32 shows an optical arrangement, at a diopter of −0.5 m$^{-1}$, in the eighth embodiment of the eyepiece system according to the present invention. For convenience of illustration, a plane-parallel plate-like member in FIG. 32 is shown by developing the pentagonal roof prism.

FIGS. 33A–33D, 34A–34D, and 35A–35D show aberration characteristics in the eighth embodiment. Also, the diopter (m$^{-1}$) is taken as the axis of abscissas relative to spherical aberration and curvature of field, and the angle (minute) is taken as the axis of abscissas relative to chromatic aberration of magnification.

The eighth embodiment has the pentagonal roof prism 7 and the eyepiece system 8. The eyepiece system 8 includes, in order from the object side, the first lens component 8a with positive refracting power which is a positive biconvex lens, the second lens component 8b with positive refracting power which is a single positive meniscus lens with a convex surface directed toward the object side, and the third lens component 8c' which is a cemented lens of a positive biconvex lens element and a negative biconcave lens element, having negative refracting power as a whole. The diopter adjustment is made by moving the second lens component 8b.

Subsequently, numerical data of optical members constituting the eyepiece system of the eighth embodiment are shown below.

Numerical Data 8

Diopter $(m^{-1})$ = +1 ~ −0.5 ~ −3
fl (mm) = 47.55 ~ 50.38 ~ 57.02
Pupil diameter (mm) = 8
Diagonal length Y (or Y') (mm) = 21.9
fb'= 1.4 f'

| | | | |
|---|---|---|---|
| $r_1 = \infty$ | | | |
| | $d_1 = 4.50$ | | |
| $r_2 = \infty$ | | | |
| | $d_2 = 80.38$ | $n_{d2} = 1.51633$ | $\upsilon_{d2} = 64.14$ |
| $r_3 = \infty$ | | | |
| | $d_3 = 16.14$ | | |
| $r_4 = 31.782$ | | | |
| | $d_4 = 7.50$ | $n_{d4} = 1.49700$ | $\upsilon_{d4} = 81.54$ |
| $r_5 = -65.303$ | | | |
| | $d_5 = D5$ | | |
| $r_6 = 15.563$ | | | |
| | $d_6 = 3.71$ | $n_{d6} = 1.69680$ | $\upsilon_{d6} = 55.53$ |
| $r_7 = 44.319$ | | | |
| | $d_7 = D7$ | | |
| $r_8 = 106.618$ | | | |
| | $d_8 = 2.50$ | $n_{d8} = 1.69680$ | $\upsilon_{d8} = 55.53$ |
| $r_9 = -30.748$ | | | |
| | $d_9 = 1.00$ | $n_{d9} = 1.80610$ | $\upsilon_{d9} = 40.92$ |
| $r_{10} = 12.778$ | | | |
| | $d_{10} = 23.00$ | | |
| $r_{11} = $ Pupil | | | |

| Diopter $(m^{-1})$ = | +1 ~ | -0.5 ~ | -3 |
|---|---|---|---|
| D5 | 1.07 | 1.51 | 2.39 |
| D7 | 2.82 | 2.38 | 1.50 |

Numerical values of the conditions in the fourth to eighth embodiments are listed in Table 3.

TABLE 3

| Conditions | 4th embodiment | 5th embodiment | 6th embodiment | 7th embodiment | 8th embodiment |
|---|---|---|---|---|---|
| (8) | 3.21 | 3.37 | 3.37 | 3.37 | 3.37 |
| (9) | −0.36 | −0.37 | −0.40 | −0.38 | −0.33 |
| (10) | 0.78 | 0.82 | 0.83 | 0.75 | 0.88 |
| (13) | 21.9 | 21.9 | 21.9 | 21.9 | 21.9 |

Values of the factors of the conditions in the fourth to eighth embodiments are shown in Table 4.

TABLE 4

| Conditions | 4th embodiment | 5th embodiment | 6th embodiment | 7th embodiment | 8th embodiment |
|---|---|---|---|---|---|
| f (f") | 50.02 | 50.80 | 50.81 | 50.80 | 50.38 |
| f1 | 39.25 | 41.57 | 42.29 | 38.21 | 44.15 |
| f2 | 36.83 | 38.9 | 43.93 | 43.9 | 32.69 |
| f3 | −18.06 | −18.72 | −20.47 | −19.15 | −16.85 |
| f12 | 19.79 | 21.06 | 22.2 | 21.4 | 19.77 |

TABLE 4-continued

| Conditions | 4th embodiment | 5th embodiment | 6th embodiment | 7th embodiment | 8th embodiment |
|---|---|---|---|---|---|
| fb' (f'b') | 70.15 | 73.65 | 73.65 | 73.65 | 73.65 |
| Y (Y') | 21.88 | 21.88 | 21.88 | 21.88 | 21.88 |

What is claimed is:

1. A single-lens reflex camera comprising:

a screen on which an image of an object is projected;

a plurality of reflection surfaces for erecting the image on the screen; and an eyepiece system with positive refracting power for observing the image, wherein the eyepiece system comprises, in order from an object side, a first lens component with positive refracting power, a second lens component with positive refracting power, and a third lens component with negative refracting power, and the single-lens reflex camera satisfies the following conditions:

$2.5 < fb'/Y < 4.0$ $-1.0 < f3/f' < -0.2$ $0.4 < f1/f' < 0.95$ where fb' is an air-equivalent length, at a diopter of −0.5 ($m^{-1}$), from the screen to an entrance surface of the first lens component; Y is a diagonal length of a picture plane on the screen; f3 is a focal length of the third lens component; f1 is a focal length of the first lens component, and f' is a focal length of an entire system from the screen to an exit surface of the eyepiece system at a diopter of −0.5 ($m^{-1}$).

2. A single-lens reflex camera comprising:

a screen on which an image of an object is projected;

a plurality of reflection surfaces for erecting the image on the screen; and an eyepiece system with positive refracting power for observing the image, wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the single-lens reflex camera satisfies the following conditions:

$2.5 < fb'/Y < 4.0$ $-1.0 < f3/f' < -0.2$ $0.4 < f1/f' < 0.95$ where fb' is an air-equivalent length, at a diopter of −0.5 ($m^{-1}$), from the screen to an entrance surface of the first lens component; Y is a diagonal length of a picture plane on the screen; f3 is a focal length of the third lens component; f1 is a focal length of the first lens component, and f' is a focal length of an entire system from the screen to an exit surface of the eyepiece system at a diopter of −0.5 ($m^{-1}$).

3. A single-lens reflex camera comprising:

a screen on which an image of an object is projected;

a plurality of reflection surfaces for erecting the image on the screen; and an eyepiece system with positive refracting power for observing the image, wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the single-lens reflex camera satisfies the following conditions:

$2.5 < fb'/Y < 4.0$ $0.4 < f1/f' < 0.95$ where fb' is an air-equivalent length, at a diopter of −0.5 ($m^{-1}$), from the screen to an entrance surface of the first lens component; Y is a diagonal length of a picture plane on the screen; f1 is a focal length of the first lens component, and f' is a focal length of an entire system from the screen to an exit surface of the eyepiece system at a diopter of −0.5 ($m^{-1}$).

4. A single-lens reflex camera comprising:

a screen on which an image of an object is projected;

a plurality of reflection surfaces for erecting the image on the screen; and an eyepiece system with positive refracting power for observing the image, wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the single-lens reflex camera satisfies the following conditions:

$-1.0 < f3/f' < -0.2$ $0.4 < f1/f' < 0.95$ where f3 is a focal length of the third lens component; f1 is a focal length of the first lens component, and f' is a focal length of an entire system from the screen to an exit surface of the eyepiece system at a diopter of −0.5 ($m^{-1}$).

5. A single-lens reflex camera comprising:

a screen on which an image of an object is projected;

a plurality of reflection surfaces for erecting the image on the screen; and an eyepiece system with positive refracting power for observing the image, wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the single-lens reflex camera satisfies the following conditions:

$$0.4 < f1/f' < 0.95$$

where f1 is a focal length of the first lens component and f' is a focal length of an entire system from the screen to an exit surface of the eyepiece system at a diopter of $-0.5$ (m$^{-1}$).

6. A single-lens reflex camera according to claim 1 or 2, further satisfying the following condition:

$$16.0 < Y < 28.0$$

7. A single-lens reflex camera according to claim 1 or 2, further satisfying the following condition:

$$0.5 < f2/f' < 1.2$$

where f2 is a focal length of the second lens component.

8. A single-lens reflex camera according to claim 1 or 2, further satisfying the following condition:

$$-1.3 < f12/f3 < -0.9$$

where f12 is a combined focal length of the first lens component and the second lens component.

9. A single-lens reflex camera according to claim 1 or 2, wherein the first lens component comprises a positive lens element with an Abbe's number of at least 80.

10. A single-lens reflex camera according to claim 1 or 2, wherein the second lens component is moved along an optical axis and thereby a diopter adjustment is made.

11. A single-lens reflex camera according to claim 1 or 2, the second lens component or the third lens component consists of a cemented lens.

12. A single-lens reflex camera according to claim 1 or 2, wherein the eyepiece system consists of four lens elements.

13. A camera comprising:

a plurality of reflection surfaces for erecting an image on an image plane; and an eyepiece system with positive refracting power for observing the image, wherein the eyepiece system comprises, in order from an object side, a first lens component with positive refracting power, a second lens component with positive refracting power, and a third lens component with negative refracting power, and the camera satisfies the following conditions:

$$2.5 < f'b'/Y' < 4.0$$

$$-1.0 < f3/f''' < -0.2$$

$$0.4 < f1/f''' < 0.95$$

where f'b' is an air-equivalent length, at a diopter of $-0.5$ (m$^{-1}$), from the image plane to an entrance surface of the first lens component; Y' is a diagonal length of a picture plane on the image plane; f3 is a focal length of the third lens component; f1 is a focal length of the first lens component; and f''' is a focal length of an entire system from the image plane to an exit surface of the eyepiece system at a diopter of $-0.5$ (m$^{-1}$).

14. A camera comprising:

a plurality of reflection surfaces for erecting an image on an image plane; and an eyepiece system with positive refracting power for observing the image, wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the camera satisfies the following conditions:

$$2.5 < f'b'/Y' < 4.0$$

$$-1.0 < f3/f''' < -0.2$$

$$0.4 < f1/f''' < 0.95$$

where f'b' is an air-equivalent length, at a diopter of $-0.5$ (m$^{-1}$), from the image plane to an entrance surface of the first lens component; Y' is a diagonal length of a picture plane on the image plane; f3 is a focal length of the third lens component; f1 is a focal length of the first lens component, and f''' is a focal length of an entire system from the image plane to an exit surface of the eyepiece system at a diopter of $-0.5$ (m$^{-1}$).

15. A camera comprising:

a plurality of reflection surfaces for erecting an image on an image plane; and an eyepiece system with positive refracting power for observing the image, wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the camera satisfies the following conditions:

$$2.5 < f'b'/Y' < 4.0$$

$$0.4 < f1/f''' < 0.95$$

where f'b' is an air-equivalent length from the image plane to an entrance surface of the first lens component; Y' is a diagonal length of a picture plane on the image plane; f1 is a focal length of the first lens component, and f''' is a focal length of an entire system from the image plane to an exit surface of the eyepiece system at a diopter of $-0.5$ (m$^{-1}$).

16. A camera comprising:

a plurality of reflection surfaces for erecting an image on an image plane; and an eyepiece system with positive refracting power for observing the image, wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the camera satisfies the following conditions:

$$-1.0 < f3/f''' < -0.2$$

$$0.4 < f1/f''' < 0.95$$

where f3 is a focal length of the third lens component; f1 is a focal length of the first lens component, and f''' is a focal length of an entire system from the image plane to an exit surface of the eyepiece system at a diopter of $-0.5$ ($m^{-1}$).

17. A camera comprising:
   a plurality of reflection surfaces for erecting an image on an image plane; and
   an eyepiece system with positive refracting power for observing the image,
   wherein the eyepiece system comprises, in order from an object side, a first lens component with positive refracting power, a second lens component with positive refracting power consisting of a single meniscus lens element with a convex surface directed toward the object side, and a third lens component with negative refracting power as a whole in which a pupil-side surface is stronger in refracting power than an object-side surface, and the camera satisfies the following conditions:

$$0.4 < f1/f''' < 0.95$$

where f1 is a focal length of the first lens component and f''' is a focal length of an entire system from the image plane to an exit surface of the eyepiece system at a diopter of $-0.5$ ($m^{-1}$).

18. A camera according to claim 13 or 14, further satisfying the following condition:

$$16.0 < Y' < 28.0.$$

* * * * *

UNITED STATES PATENT AND TRADEMARK OFFICE
Certificate

Patent No. 6,804,462 B2                          Patented: October 12, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tomoyuki Satori, Kawagoe (JP).

Signed and Sealed this Eighteenth Day of November 2014.

DAVID M. GRAY
*Supervisory Patent Examiner*
Art Unit 2852
Technology Center 2800